United States Patent [19]

Saito et al.

[11] Patent Number: 4,901,001
[45] Date of Patent: Feb. 13, 1990

[54] POWER CONVERTER FOR AC LOAD

[75] Inventors: Suzuo Saito; Tadao Mose, both of Tokyo, Japan

[73] Assignee: Kabushiki Kaisha Toshiba, Kawsaki, Japan

[21] Appl. No.: 271,404

[22] Filed: Nov. 14, 1988

Related U.S. Application Data

[63] Continuation of Ser. No. 27,126, Mar. 16, 1987, abandoned, which is a continuation of Ser. No. 705,676, Feb. 26, 1985, abandoned.

[30] Foreign Application Priority Data

Mar. 2, 1984 [JP] Japan ................................. 59-40107
May 30, 1984 [JP] Japan ................................. 59-110265

[51] Int. Cl.$^4$ ........................... H02P 5/40; H02P 1/30
[52] U.S. Cl. ...................................... 318/779; 318/807
[58] Field of Search ............... 318/798, 806, 721-723, 318/803, 807-811, 778, 779

[56] References Cited

U.S. PATENT DOCUMENTS

| | | | |
|---|---|---|---|
| 3,696,278 | 10/1972 | Kunyoshi et al. | 318/778 |
| 3,787,724 | 1/1974 | Pedersen et al. | 318/778 |
| 3,939,387 | 2/1976 | Maeda | 318/805 |
| 3,971,972 | 7/1976 | Stich | 318/811 |
| 4,238,821 | 12/1980 | Walker | 318/803 |
| 4,334,182 | 6/1982 | Landino | 318/808 |

Primary Examiner—David Smith, Jr.
Attorney, Agent, or Firm—Oblon, Spivak, McClelland, Maier & Neustadt

[57] ABSTRACT

A power converter for starting an AC induction motor includes a frequency detector which compares the frequency of an AC output of the converter with a predetermined frequency and generates a detection signal if the AC output frequency is lower than the predetermined frequency, a current controller which controls the power converter such that an AC output current supplied to the motor is determined in accordance with a given current reference if the detection signal is generated, and a voltage controller which controls the power converter so that an AC output voltage applied to the motor is regulated in accordance with a given voltage reference if the detection signal disappears.

9 Claims, 29 Drawing Sheets

F I G. 3A
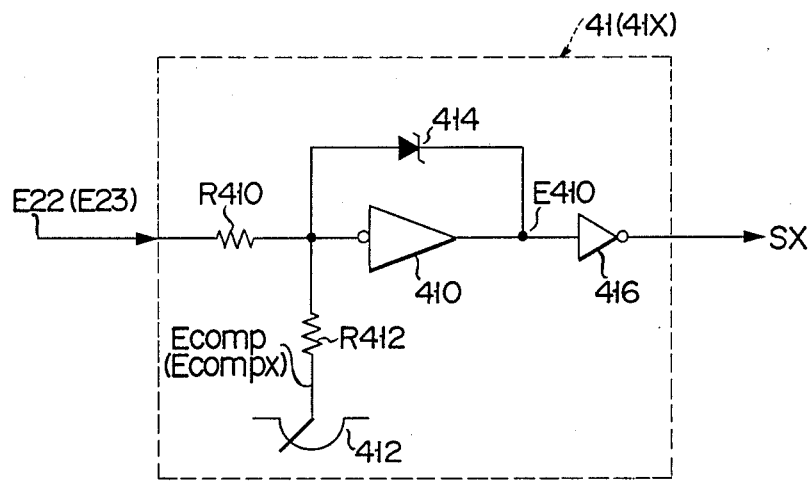
F I G. 3B
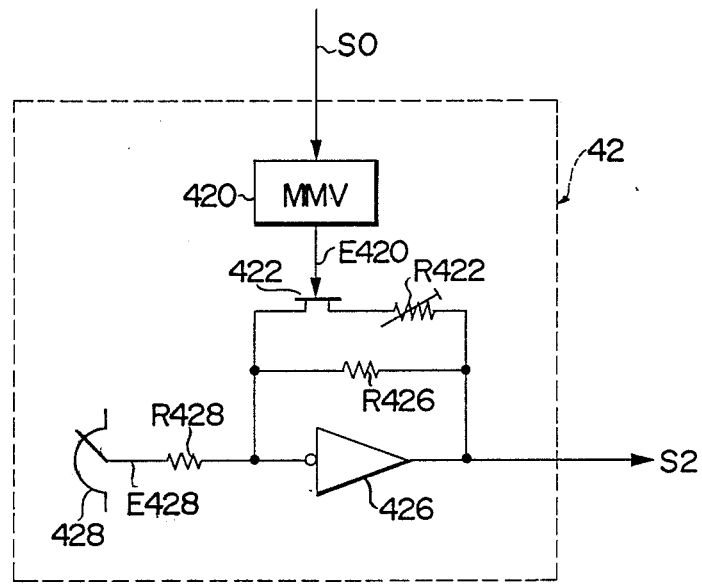

F I G. 3D
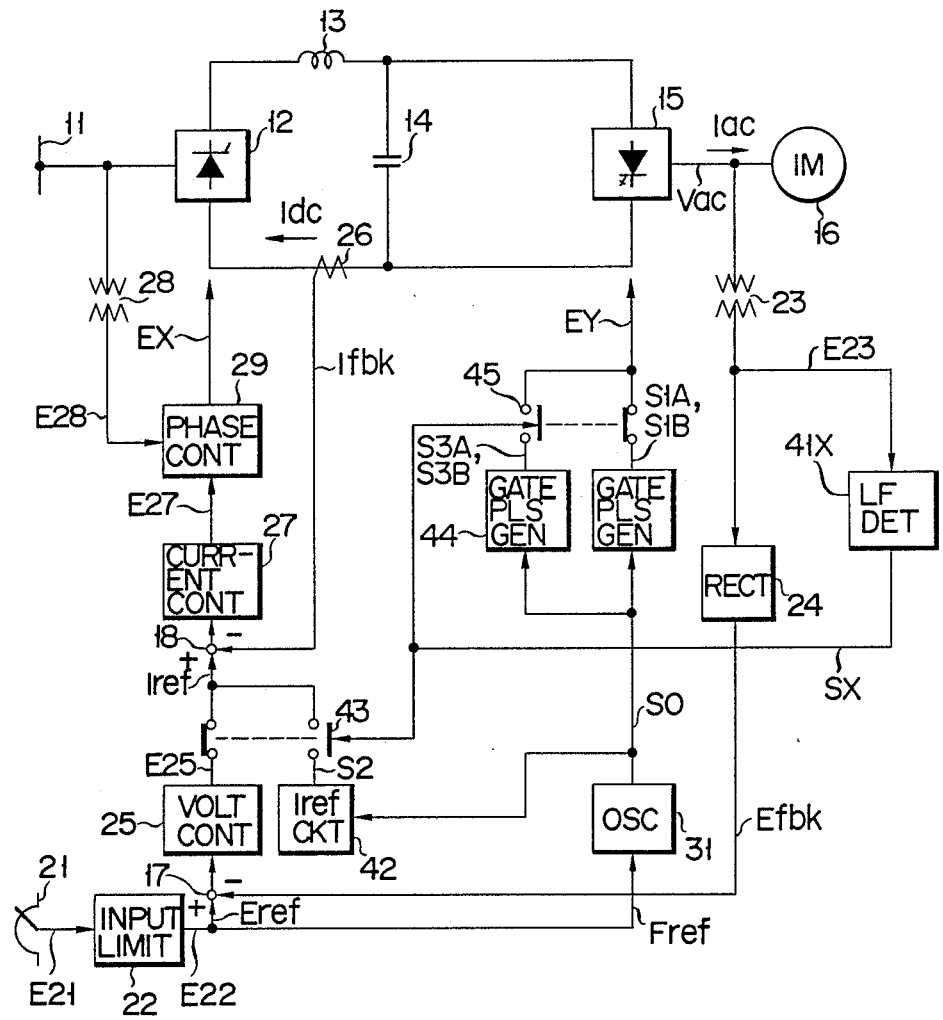

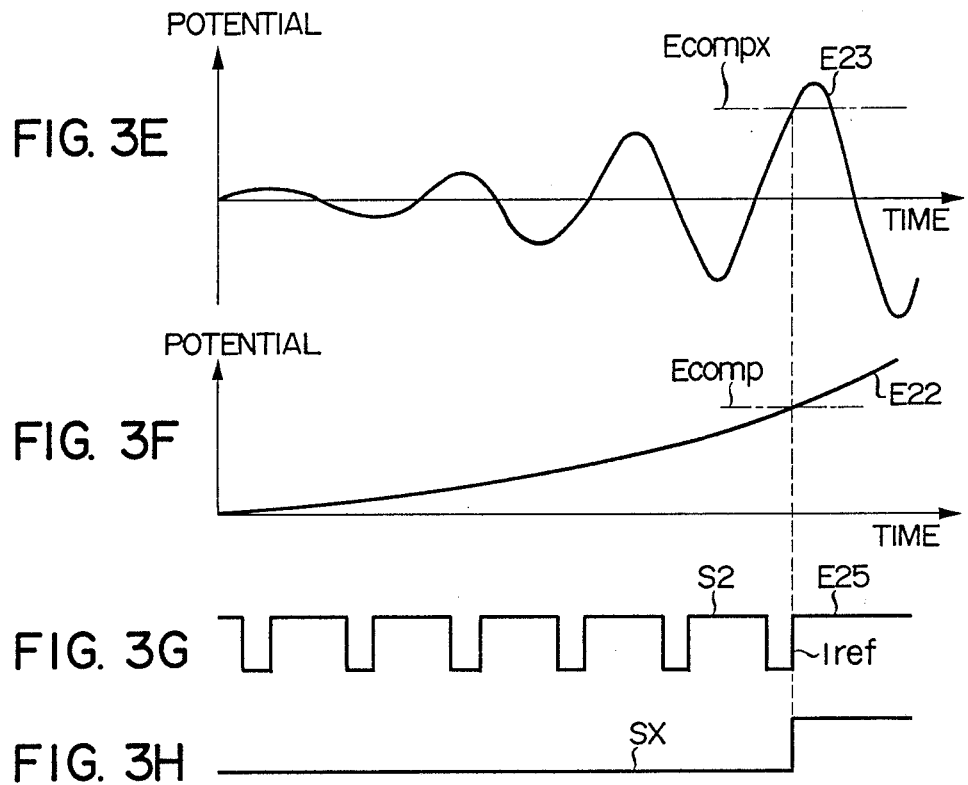
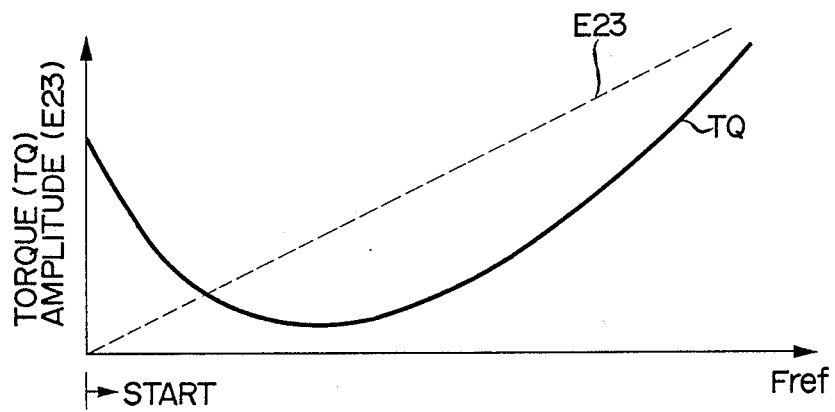

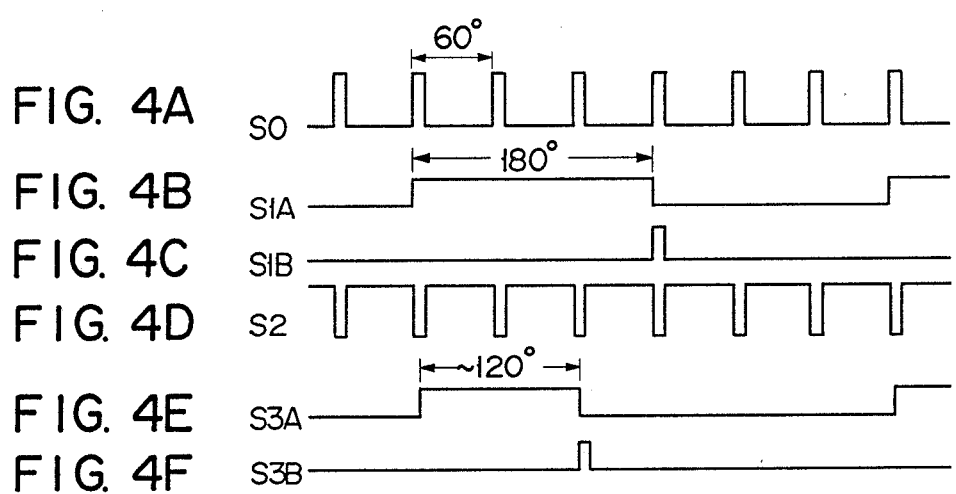
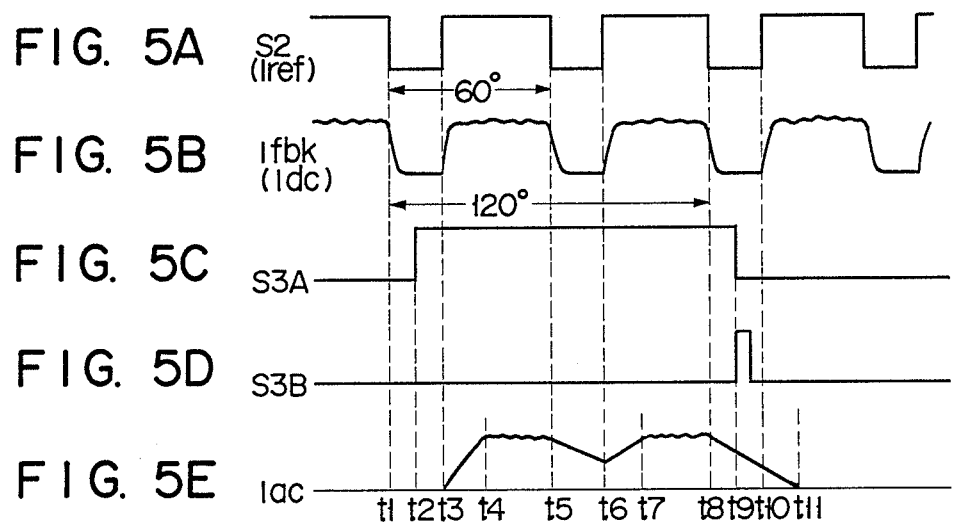

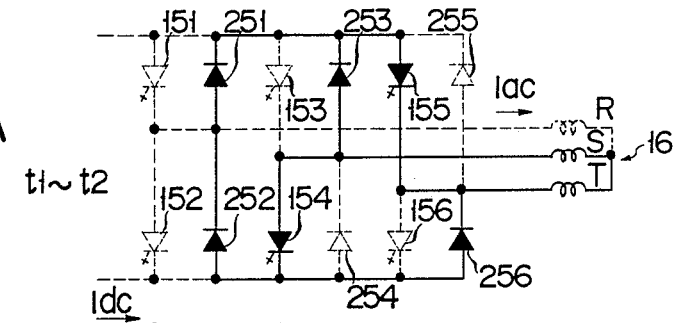
FIG. 6A  t1~t2
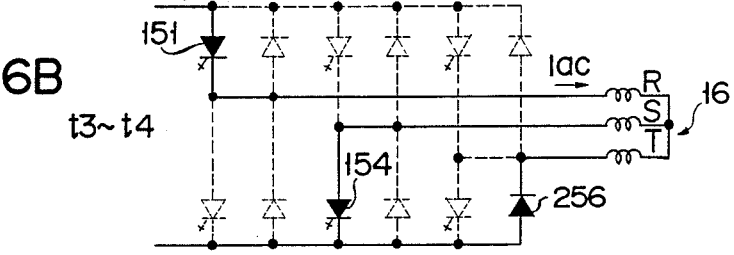
FIG. 6B  t3~t4
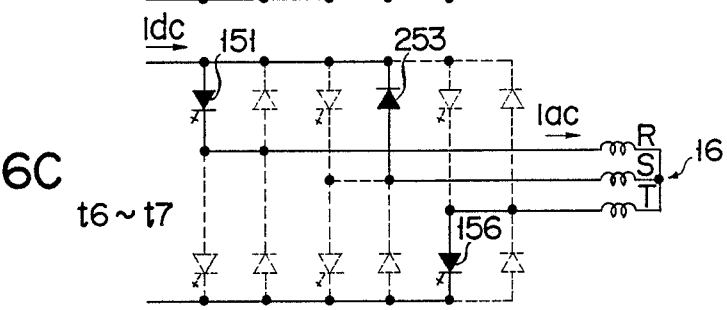
FIG. 6C  t6~t7
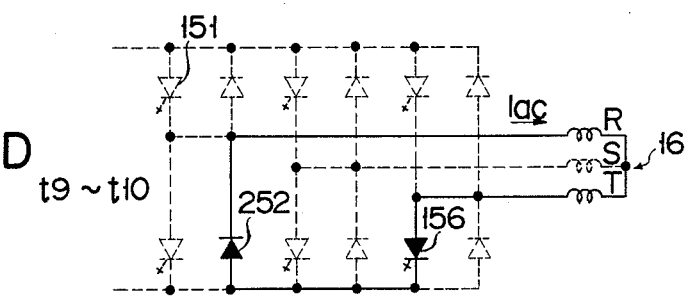
FIG. 6D  t9~t10
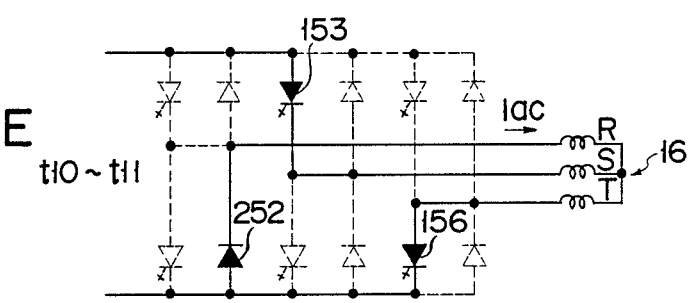
FIG. 6E  t10~t11

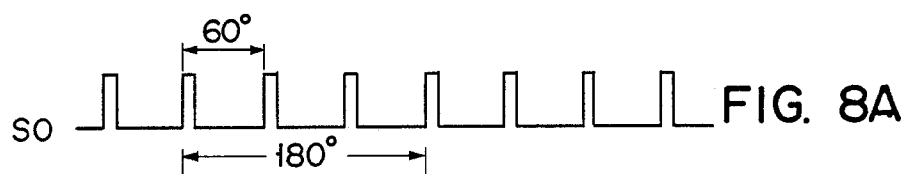
FIG. 8A
FIG. 8B
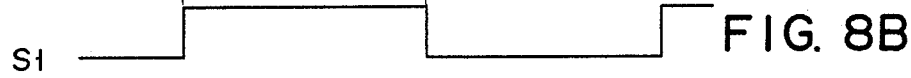
FIG. 8C
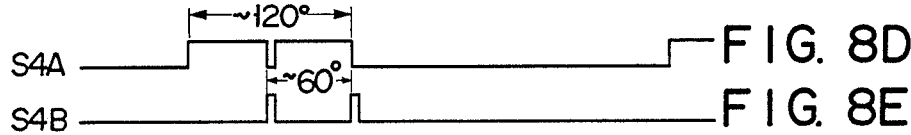
FIG. 8D
FIG. 8E
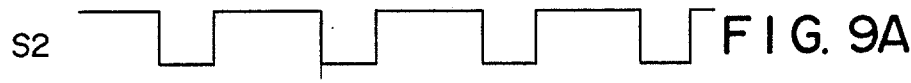
FIG. 9A
FIG. 9B
FIG. 9C
FIG. 9D
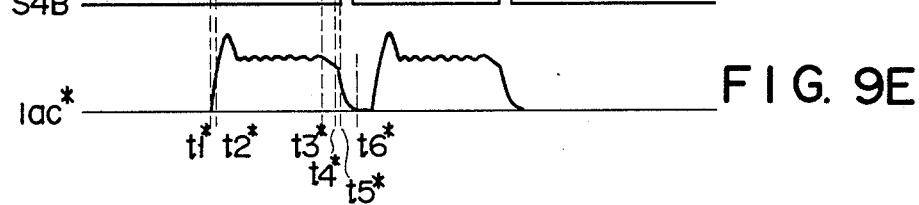
FIG. 9E $t_1^* \sim t_4^*$ $t_4^* \sim t_6^*$ $t_5^* \sim t_6^*$

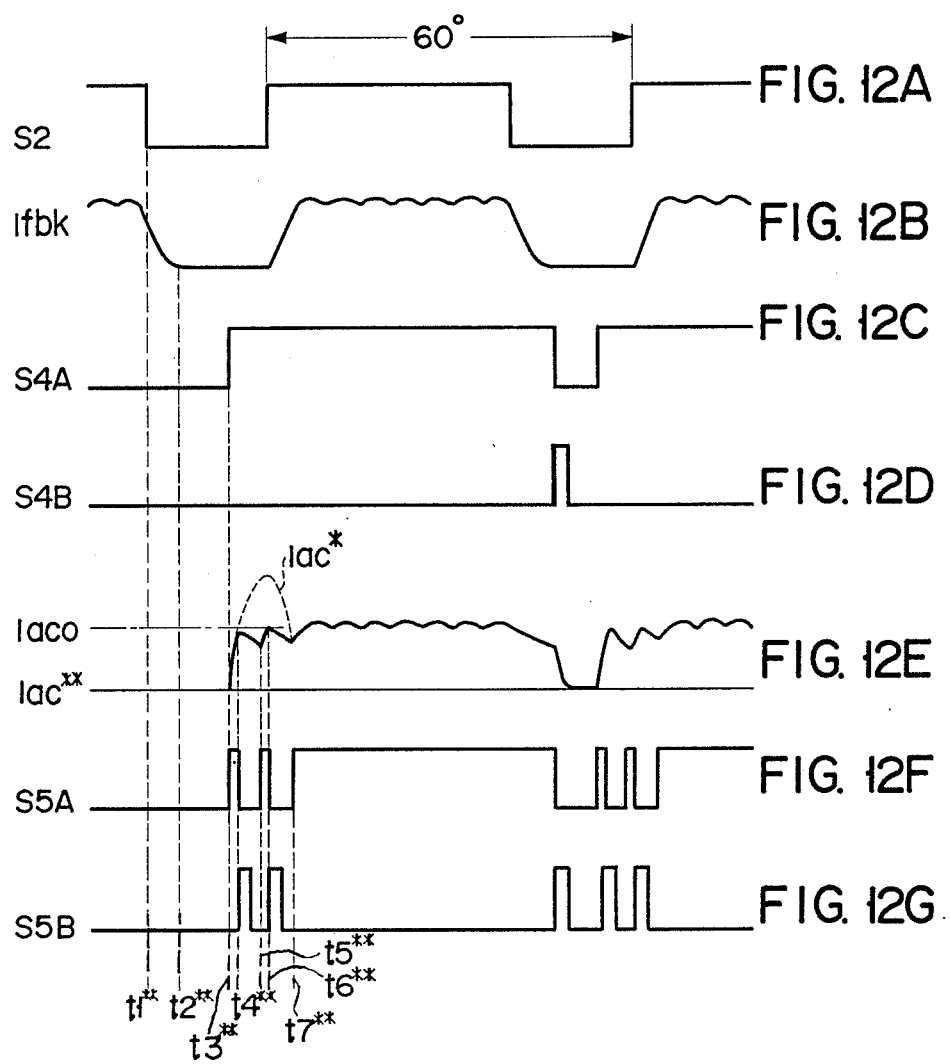

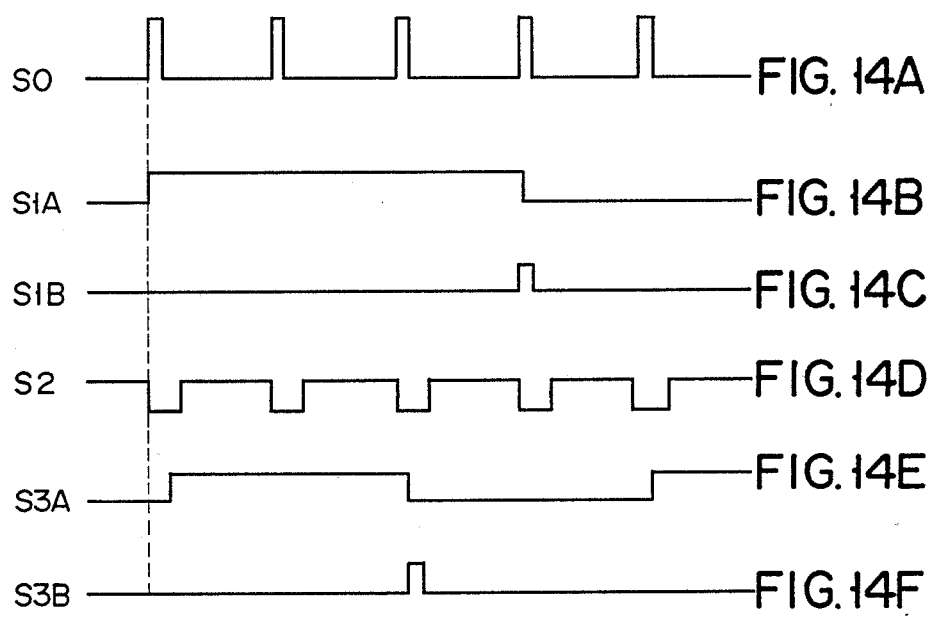
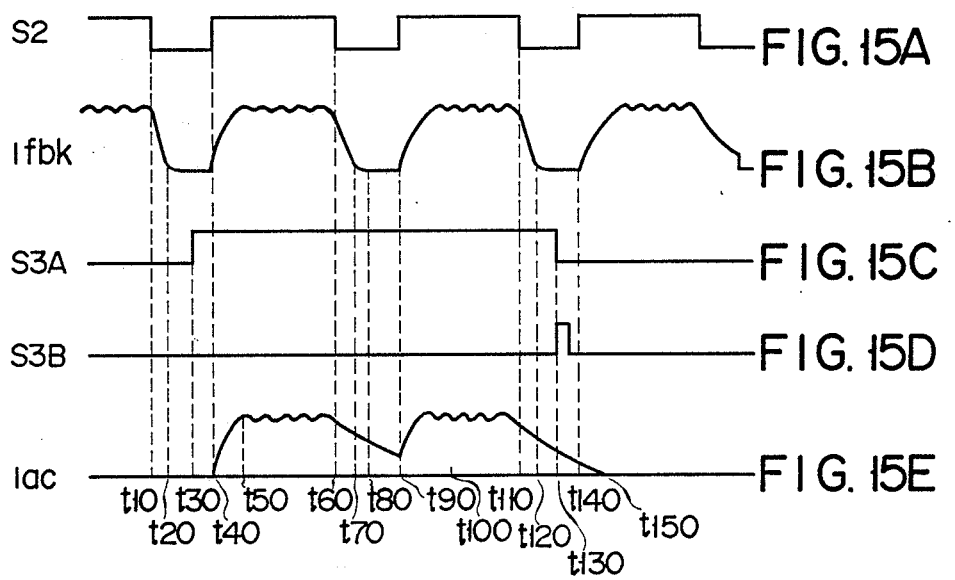

~t10 t20~t40 t50~t60 t80~t90

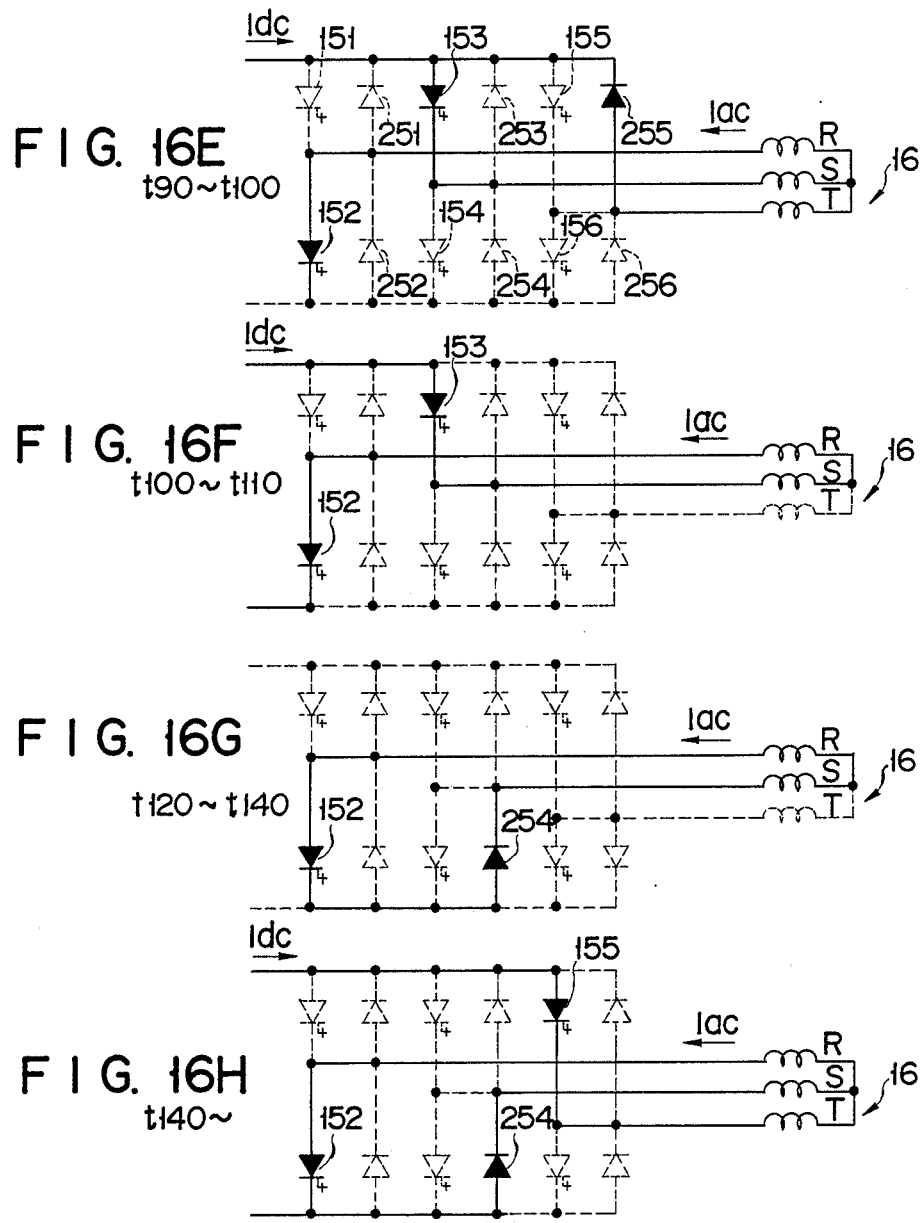

F I G. 17
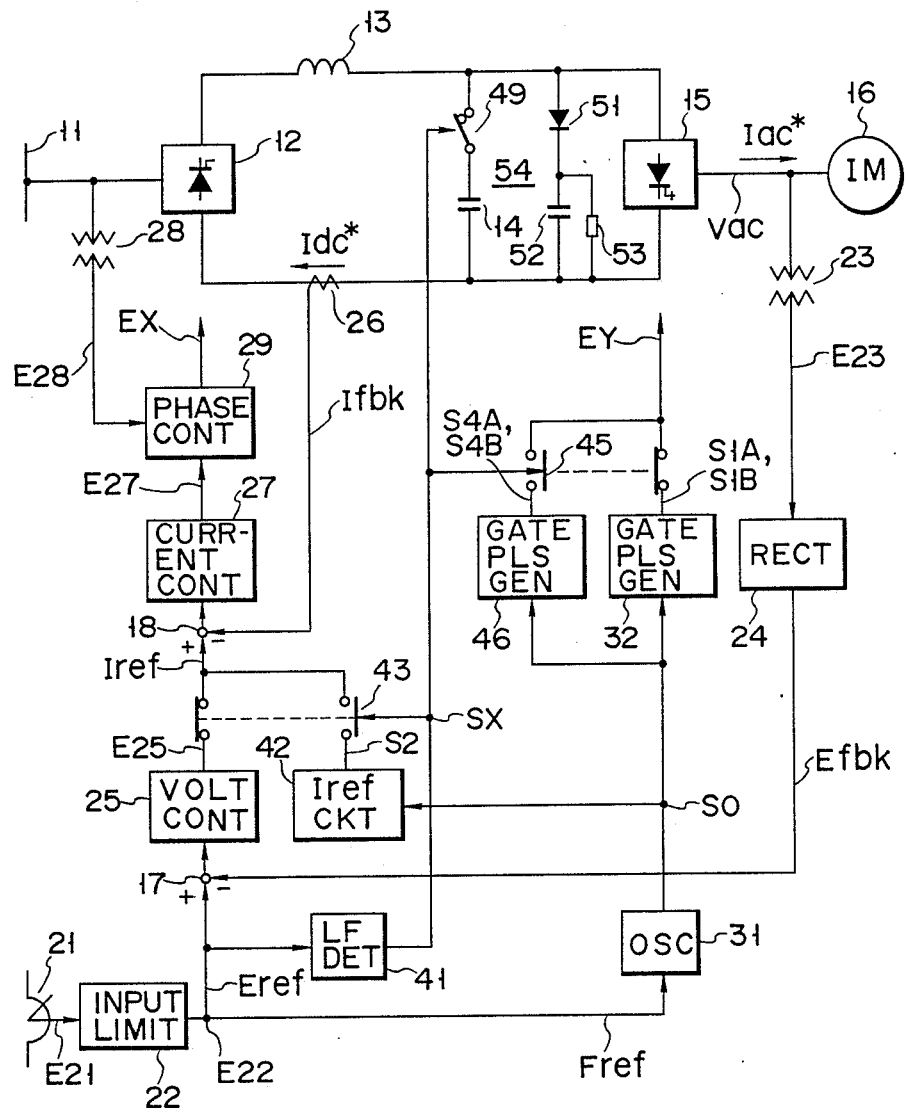

FIG.18A S0
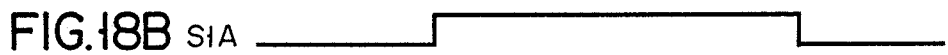
FIG.18B S1A
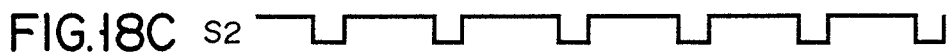
FIG.18C S2
FIG.18D S4A
FIG.18E S4B
FIG.19A S2
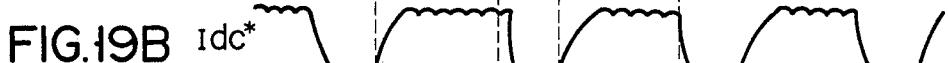
FIG.19B Idc*
FIG.19C S4A
FIG.19D S4B
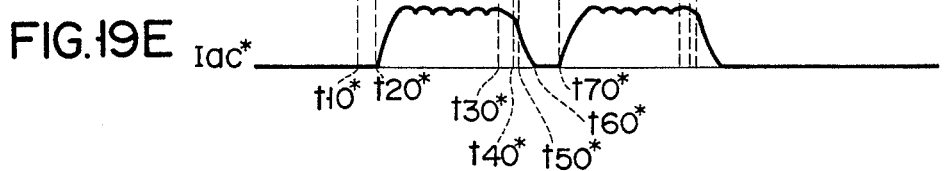
FIG.19E Iac*

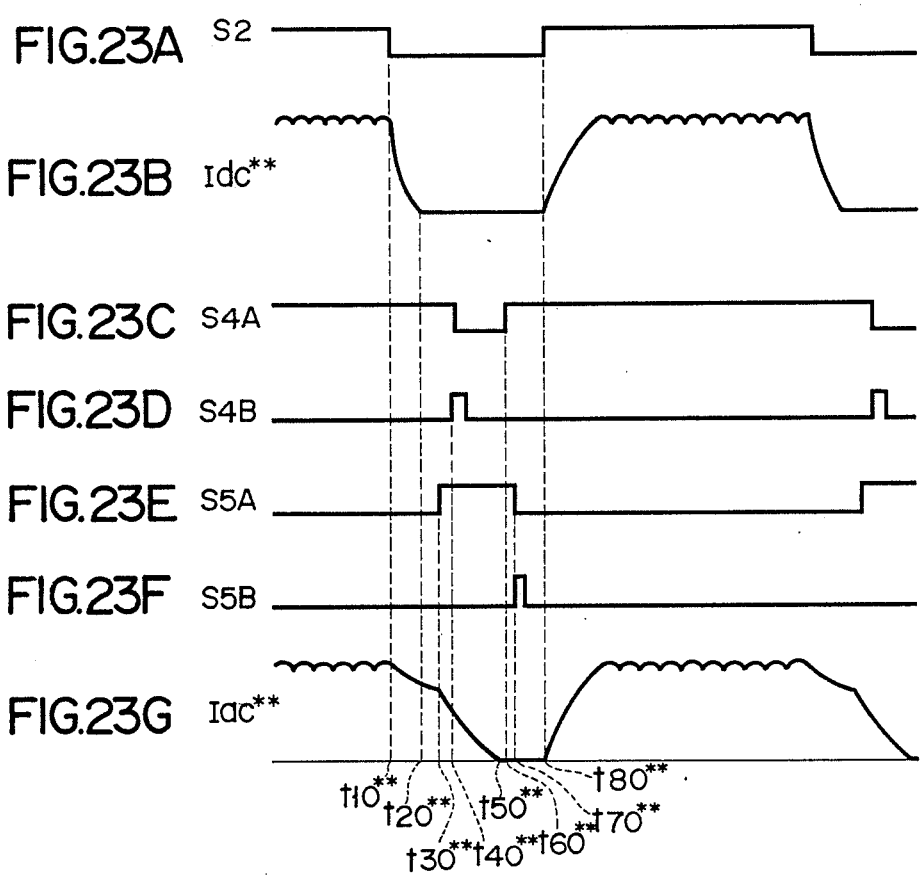

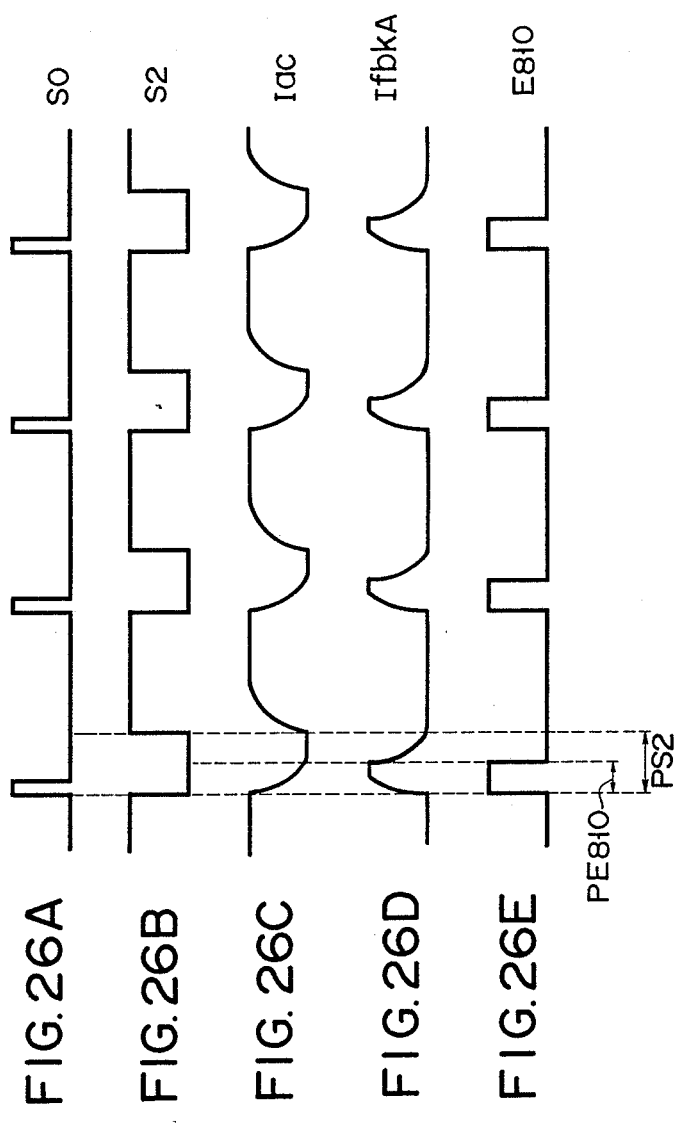

POWER CONVERTER FOR AC LOAD

This application is a continuation of application Ser. No. 027,126 filed on Mar. 16, 1987, now abandoned, which is a continuation of Ser. No. 705,676 filed Feb. 26, 1985, abandoned.

BACKGROUND OF THE INVENTION

The present invention relates to a power converter for energizing an AC load (e.g., motor), particularly relating to a voltage-source power converter which ensures a sufficient start torque for an induction motor.

A frequency-variable and output-variable power converter is advantageous for energizing or actuating an AC motor. According to such a power converter, (1) it is possible to effectively suppress an overcurrent at the time of starting of the motor; (2) it is possible to vary the rotating speed of the motor by changing the frequency of a converter output, thereby saving energy loss and achieving a variable speed operation; and (3) a high-grade controllability as that attained in a DC motor control system may be obtained when a suitable control scheme is applied. A voltage-source inverter, current-source inverter, load-commutated inverter or cycloconverter is generally used as the frequency-variable and output-variable power converter.

A current-source inverter, load-commutated inverter or cycloconverter is a sort of a current controlled converter. Although the use of such a current controlled converter provides an AC motor control system with various advantages, it invites a certain problem. That is, when the operating frequency of an AC motor is high, since the influence of characteristics of the motor becomes prominent, difficulties are involved in determining the circuit constant of a power converter main circuit or in assuring a sufficient control tolerance.

On the other hand, a voltage-source inverter is a sort of a voltage controlled converter. A voltage controlled converter may ideally serve as an AC power source for actuating an AC motor.

FIG. 1 shows a conventional voltage-source inverter for actuating an AC motor. In FIG. 1, a DC power is obtained from an AC power line 11 through a rectifier 12. The DC power is supplied to an inverter 15 through a filter circuit of a reactor 13 and capacitor 14. Inverter 15 generates from the DC power an AC current Iac having a given frequency which is variable. Current Iac is supplied to an induction motor (AC load) 16 which may have a power capacity of thousands kW order.

An AC voltage Vac applied to motor 16 is detected as a voltage signal E23 via a potential transformer 23. Signal E23 is rectified by a rectifier 24. Rectifier 24 delivers a feedback signal Efbk whose DC potential corresponds to the amplitude of AC voltage Vac. Signal Efbk is supplied to the negative input of a comparator 17. The positive input of comparator 17 receives a voltage reference signal Eref. Signal Eref is obtained via an input limiter 22 from a reference value designator 21. The DC potential of an output E21 from designator 21 is optionally changed by the manipulation of an operator of the power converter. The maximum and minimum DC potentials of output E21 are restricted to predetermined values by the circuit operation of limiter 22, and a potential limited output E22 from limiter 22 is supplied as the signal Eref to comparator 17. Comparator 17 generates a potential difference (Eref−Efbk) between the inputted signals Eref and Efbk. This potential difference (Eref−Efbk) is amplified through a voltage control circuit 25 and converted into a current reference signal Iref.

Signal Iref is inputted to the positive input of a comparator 18. The negative input of comparator 18 receives a current feedback signal Ifbk. Signal Ifbk is obtained from a current transformer 26 which is located at the DC current path of rectifier 12. Thus, the potential of signal Ifbk represents the magnitude of a DC current Idc of rectifier 12. Comparator 18 generates a potential difference (Iref−Ifbk) between the inputted signals Iref and Ifbk. This potential difference (Iref−Ifbk) is amplified through a current control circuit 27 and converted into a phase control signal E27. Signal E27 is supplied to one input of a phase control circuit 29. The other input of circuit 29 receives a voltage signal E28. Signal E28 is obtained from a potential transformer 28 which is located at the circuit of AC power line 11. Signals E27 and E28 are converted by phase control circuit 29 into gate pulses EX which are used for triggering thyristors in the rectifier 12.

Output E22 from limiter 22 also serves as a frequency reference signal Fref. Signal Fref is supplied to a signal oscillator 31. Oscillator 31 generates an AC signal S0 having a frequency corresponding to the operating frequency of motor 16. Signal S0 is converted by a gate pulse generator 32 into gate pulses EY which are used for triggering GTOs (gate turn-off thyristors) in the inverter 15.

FIG. 2 shows a typical circuit configuration of the main portion of a 3-phase voltage-source inverter. In FIG. 2, rectifier 12 is formed with thyristors 121 to 126. Rectifier 12 serves as a DC power source which can control the DC output current Idc. Such a DC power source may be a chopper circuit provided with a battery or the like. Inverter 15 employs GTOs 151 to 156 as main switching elements. Diodes 251 to 256 are cross-coupled with GTOs 151 to 156, respectively. Here, self extinguishing type semiconductor elements such as GTOs, GTRs or the like, or a combination of thyristors and their associated forced commutation circuit, may be used for the main switching elements. In any case, these elements can be made conductive or nonconductive by gate pulses and, therefore, they are called "controllable rectifying elements." The following description will be given to a case wherein GTOs are used as the main switching elements.

Although a voltage-source inverter is suitable to a power source of an AC motor, it lacks a sufficient current control function. Thus, the voltage-source inverter involves the following problems when it is applied to an AC motor control apparatus.

(1) Before and immediately after the start of rotation, since no or little counter electromotive force (induction voltage) is generated from the AC motor, the output circuit of the inverter is substantially short-circuited with a low impedance of the motor. This fact disturbs an accurate control of voltage and frequency references based on the conditions of the AC motor or on the conditions of machines to be actuated by the AC motor. From this, it is hard to achieve starting of the motor with a rated current value.

(2) Unless the control for starting the motor with a rated current as mentioned above is effected, a sufficient starting torque of the motor cannot be obtained by a voltage-source inverter having a normal power capacity. Or, an excessive power capacity is required to the inverter for ensuring a sufficient starting torque of the motor. Accordingly, so long as the above motor starting control with a rated current cannot be achieved, an AC motor control apparatus for ensuring a sufficient starting torque becomes very costly.

(3) Conventionally, a PWM (pulse width modulation) control enables to achieve the starting of an AC motor with a certain torque, while avoiding an excessive inverter output current. However, such a PWM control inherently requires the proper use of small-capacity main switching elements, such as GTRs or power MOSFETs, which have to be operated in chopping with a high frequency. From this, it is difficult to apply a PWM control method to a voltage-source inverter using GTOs or thyristors. Further, even if GTRs or power MOSFETs are used for the voltage-source inverter, an output current from the inverter involves large ripples, resulting in reducing actually available output power of the inverter.

SUMMARY OF THE INVENTION

It is accordingly an object of the present invention to provide a power converter for starting the actuation of an AC load with an improved waveform output, particularly providing a voltage-source power converter which ensures a sufficient starting torque for an induction motor.

To achieve the above object, a power converter of the invention includes:

means (41) for generating a detection signal (SX) when the frequency of an AC output from the converter falls within a predetermined frequency range;

means (18, 26–29, 42–45) for determining an AC output current (Iac) of the converter in accordance with a given current reference (Iref=S2) when the detection signal (SX) is generated from the generating means (41); and means (17, 18, 21–29, 31, 32) for regulating an AC output voltage (Vac) of the converter in accordance with a given voltage reference (Eref=E22) when the detection signal (SX) disappears.

According to the power converter as mentioned above, when the AC output frequency is, e.g., lower than the predetermined frequency, the AC output current (Iac) for starting the actuation of an AC load (e.g., induction motor) can be set at a given rated value according to the given current reference (Iref=S2). Since the current reference (Iref=S2) may be independent of the voltage reference (Eref=E22), a desired amount of the AC output current (Iac) can be applied to the AC load when the AC output frequency is lower than the predetermined frequency. When the AC output frequency is higher than the predetermined frequency, the AC load is actuated with a given AC output voltage (Vac) determined by the given voltage reference (Eref).

BRIEF DESCRIPTION OF THE DRAWINGS

FIG. 3A shows details of a low frequency detector 41 (41X) in the embodiment of FIG. 3 (3D);

FIG. 3B shows details of a current reference circuit 42 in the embodiment of FIG. 3;

FIG. 3D shows a modification of the embodiment in FIG. 3, wherein the frequency of an AC output from the converter is actually detected by a low frequency detector 41X;

FIGS. 3E to 3H show waveforms explaining the operation of the FIG. 3D embodiment;

FIG. 3I shows a relation between the potential of a frequency reference Fref and the output torque TQ of an induction motor 16, and a relation between the potential of frequency reference Fref and the amplitude of a signal E23 representing the AC output voltage applied to the motor;

FIGS. 4A to 4F show waveforms appearing in the configuration of the FIG. 3 embodiment;

FIGS. 5A to 5E show waveforms explaining the operation of the FIG. 3 embodiment;

FIGS. 6A to 6E respectively show the ON/OFF states of GTOs in the inverter 15 of the FIG. 3 embodiment;

FIGS. 8A to 8E show waveforms appearing in the configuration of the FIG. 7 embodiment;

FIGS. 9A to 9E show waveforms explaining the operation of the FIG. 7 embodiment;

FIGS. 12A to 12G show waveforms explaining the operation of the FIG. 11 embodiment;

FIGS. 14A to 14F show waveforms appearing in the configuration of the FIG. 13 embodiment;

FIGS. 15A to 15E show waveforms explaining the operation of the FIG. 13 embodiment;

FIGS. 16A to 16H respectively show the ON/OFF states of GTOs in the inverter 15 of the FIG. 13 embodiment;

FIG. 17 shows a fifth embodiment of the present invention;

FIGS. 18A to 18E show waveforms appearing in the configuration of the FIG. 17 embodiment;

FIGS. 19A to 19E show waveforms explaining the operation of the FIG. 17 embodiment;

FIGS. 23A to 23G show waveforms explaining the operation of the FIG. 22 embodiment;

FIGS. 26A to 26E show waveforms appearing in the configuration of the FIG. 25 embodiment.

DETAILED DESCRIPTION OF THE PREFERRED EMBODIMENTS

Figure 1:
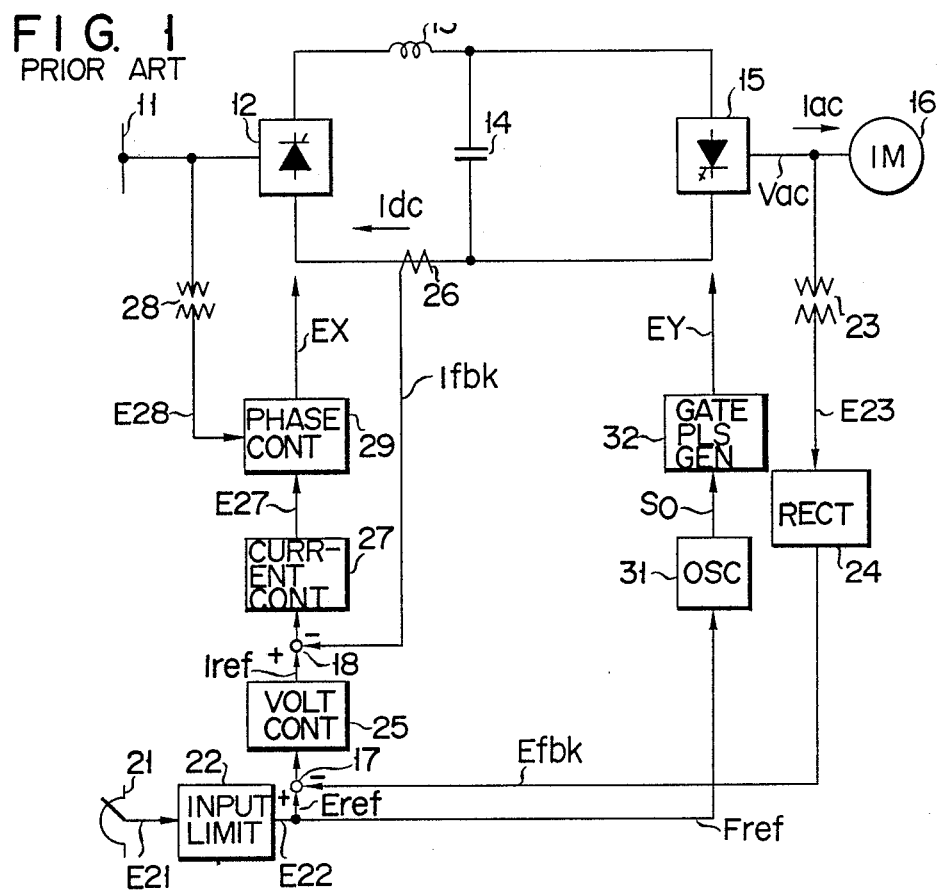
FIG. 1 shows a conventional configuration of a power converter.
Figure 2:
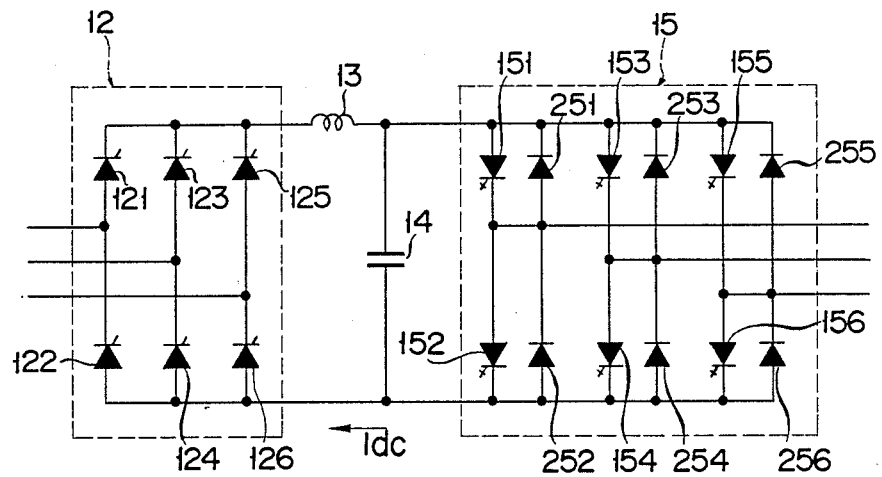
FIG. 2 shows details of a rectifier and inverter in the power converter of FIG. 1.

Hereinafter, preferred embodiments of the invention will be described in detail with reference to the accompanying drawings. In the following description, the same or similar elements are denoted by the same or similar reference numerals throughout the drawings, thereby avoiding redundant explanations.

Figure 3:
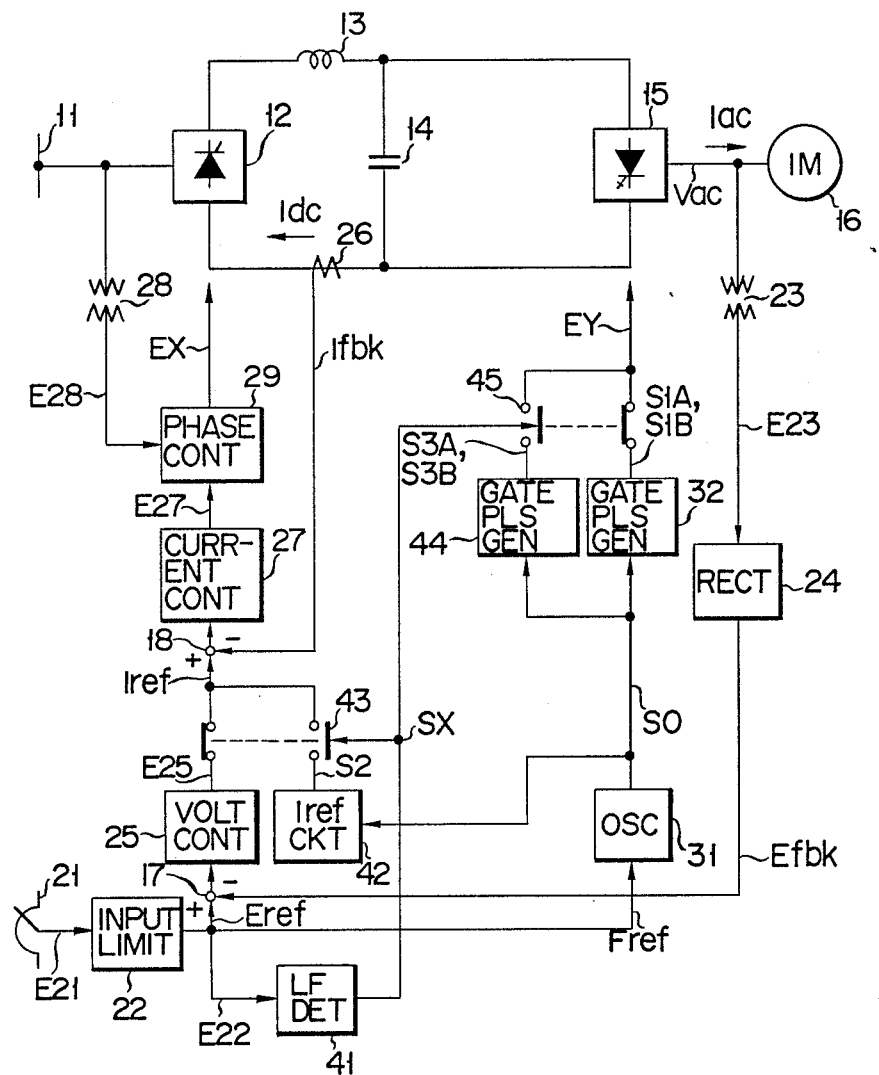
FIG. 3 shows a first embodiment of the present invention.
Figure 3C:
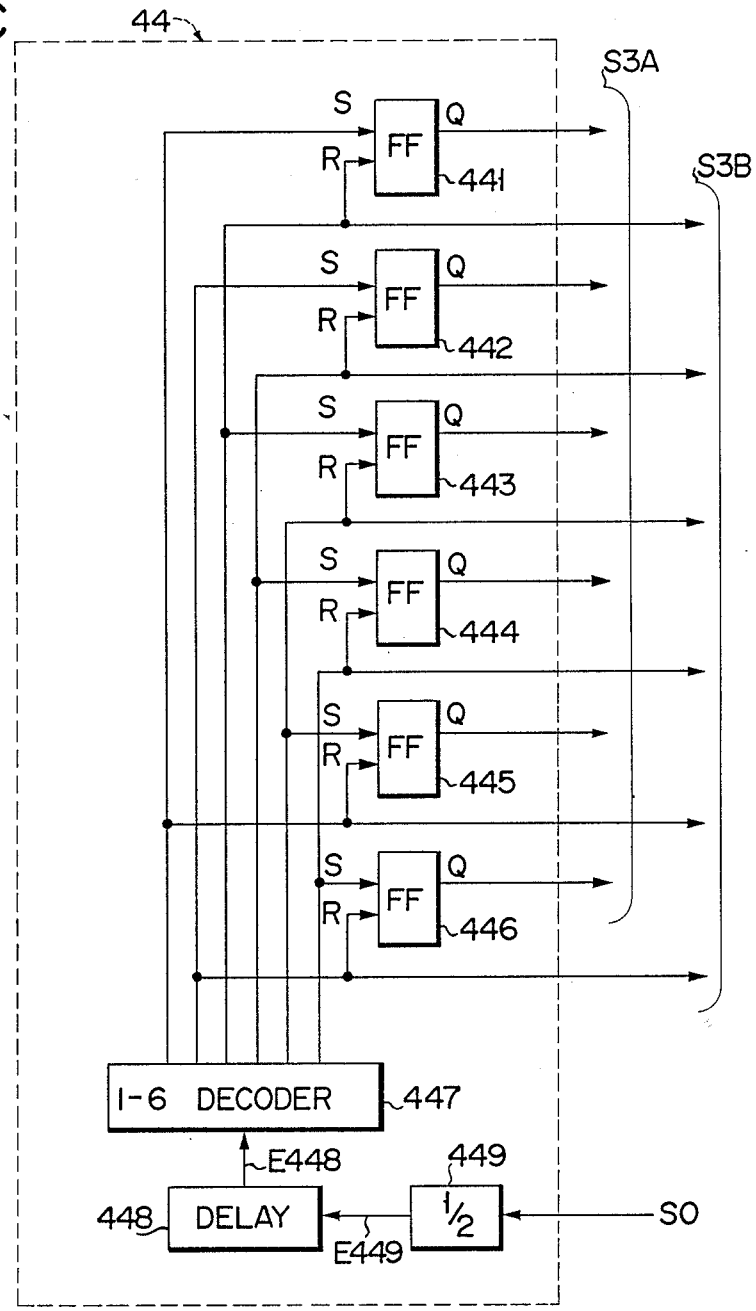
FIG. 3C shows details of a gate pulse generator 44 in the embodiment of FIG. 3.

FIG. 3 shows a power converter according to a first embodiment of the present invention. FIG. 3A shows details of a low frequency detector 41 in FIG. 3. FIG. 3B shows details of a current reference circuit 42 in FIG. 3. FIG. 3C shows details of a gate pulse generator 44 in FIG. 3. FIGS. 4A to 4F show waveforms appearing in the configuration of FIG. 3.

The power converter of FIG. 3 differs from the conventional power converter of FIG. 1 with respect to elements 41 to 45.

Low frequency detector 41 is provided to receive the potential limited output E22 from limiter 22. As shown in FIG. 3A, detector 41 may be made of a comparator circuit. In this comparator circuit, signal E22 is supplied via a resistor R410 to the inverted input of an operational amplifier 410. This inverted input receives a given comparison potential Ecomp from a potentiometer 412 through a resistor R412. The output of amplifier 410 is fed back to the inverted input via the cathode-anode path of a Zener diode 414. An output signal E410 from amplifier 410 is phase-inverted by an inverter 416 and changed to a detection signal SX.

Detector 41 compares the potential of E22 with the potential Ecomp and generates detection signal SX when the E22 potential is lower than the Ecomp potential. Since signal E22 is used for the frequency reference Fref, the potential of signal E22 represents the AC output frequency of the power converter. Accordingly, detection signal SX is generated when the AC output frequency is lower than a predetermined frequency which is defined by the comparison potential Ecomp. In other words, signal SX is generated when the AC output frequency falls within a predetermined frequency range whose boundary (upper limit of the frequency range) is defined by potential Ecomp.

Current reference circuit 42 is provided to receive the AC signal S0 (FIG. 4A) from oscillator 31. As shown in FIG. 3B, circuit 42 may be made of an output-variable pulse generator circuit. In this generator circuit, signal (pulse) S0 is supplied to a monostable multivibrator (MMV) 420. MMV 420 is triggered by the leading edge of signal S0 and generates a gate signal E420 having a pulse width determined by the time constant of this MMV. Signal E420 is supplied to the gate of an FET 422. The source (or drain) of FET 422 is connected to the inverted input of an operational amplifier 426. The drain (or source) of FET 422 is connected via a variable resistor R422 to the output of amplifier 426. A resistor R426 is connected in parallel to the series circuit of FET 422 and resistor R422. The inverted input of amplifier 426 receives through a resistor R428 a potential E428 from a potentiometer 428. Amplifier 426 delivers a current reference signal S2 (FIG. 4D).

The frequency of signal S2 is the same as signal S0. The peak potential (or amplitude) of signal S2 is adjustable by potentiometer 428 and/or resistor R422. The pulse width or the duty cycle of signal S2 is determined according to the time constant of MMV 420.

When the motor 16 in FIG. 3 is a 3-phase type, the frequency of signal S0 is selected to be six times higher than the AC output frequency of the converter. For instance, when the AC output frequency is 60 Hz, the signal S0 frequency is 360 Hz. In this case, one period of signal S0 corresponds to the phase angle of 60 degrees (=360/6 degrees) of the AC output.

In FIG. 3, signal S2 from circuit 42 is supplied to the positive input of comparator 18 via the first circuit of a dual switch 43. The positive input of comparator 18 is connected to receive a current reference signal E25 from circuit 25 via the second circuit of switch 43. Signal SX from detector 41 is applied to dual switch 43. If signal SX is generated, comparator 18 receives S2 only (the first circuit of 43 is ON and the second circuit of 43 is OFF). If signal SX is not generated, comparator 18 receives E25 only (the first circuit of 43 is OFF and the second circuit of 43 is ON).

The power converter apparatus of FIG. 3 includes a voltage control loop being formed with the circuit elements 23 - 24 - 17 - 25 - 18 - 27 - 29 - 12 - 15. The control target of this voltage control loop is given by the voltage reference Eref. The FIG. 3 apparatus also includes a current control loop being formed with the circuit elements 26 - 18 - 27 - 29 - 12. The control target of this current control loop is given by the current reference Iref. When the above signal SX is generated, the voltage control loop is cut-off by the OFF of the second circuit of switch 43. At this time, signal S2 is used for the current reference Iref independently of the voltage control loop. According to the operation of the current control loop with current reference Iref=S2, the magnitude of DC current Idc of rectifier 12 is intermittently reduced to zero for each phase angle of 60 degrees of the AC output.

Gate pulse generator 44 is provided to receive pulsate signal S0 from oscillator 31. As shown in FIG. 3C, generator 44 may be made of a flip-flop circuit. In this flip-flop circuit, signal S0 is frequency-divided by 2 through a ½ frequency divider 449 and changed to a pulsate signal E449. The pulse interval of E449 is double of the S0 pulse interval. The leading edge of signal E449 is delayed through a delay circuit 448 and changed to a signal E448. Signal E448 is decoded into first to sixth pulses by an 1-6 decoder 447. The first pulse from decoder 447 sets a flip-flop 441 and resets a flip-flop 445. The second pulse from decoder 447 sets a flip-flop 442 and resets a flip-flop 446. The third pulse from decoder 447 sets a flip-flop 443 and resets flip-flop 441. The fourth pulse from decoder 447 sets a flip-flop 444 and resets flip-flop 442. The fifth pulse from decoder 447 sets flip-flop 445 and resets flip-flop 443. The sixth pulse from decoder 447 sets flip-flop 446 and resets flip-flop 444. Six outputs from flip-flops 441 to 446 jointly constitute a gate pulse S3A, and six decoded signals from decoder 447 jointly constitute a gate pulse S3B.

In response to signal S0, generator 44 generates a set of pulses S3A and S3B (FIGS. 4E and 4F). The pulse width of S3A nearly equals to the phase angle of 120 degrees of the AC output. Pulse S3B appears at the trailing edge of pulse S3A and has a narrow pulse width. Pulse S3A renders the GTO of inverter 15 conductive, while pulse S3B renders the GTO of inverter 15 nonconductive.

As shown in FIG. 3, the set of pulses S3A and S3B is supplied as gate pulse EY to inverter 15 via the first circuit of a dual switch 45. The second circuit of switch 45 is coupled between generator 32 and inverter 15. Generator 32 generates a set of pulses S1A and S1B (FIGS. 4B and 4C) according to the signal S0 from oscillator 31. The pulse width of S1A equals to the phase angle of 180 degrees of the AC output. Narrow pulse S1B appears at the trailing edge of pulse S1A. Pulse S1A renders the GTO of inverter 15 conductive, while pulse S1B renders the GTO of inverter 15 nonconductive.

Dual switch 45 is responsive to the signal SX from detector 41. If signal SX is generated, the first circuit of 45 is ON and the second circuit of 45 is OFF, so that gate pulse EY represents S3A and S3B. If signal SX is not generated, the first circuit of 45 is OFF and the second circuit of 45 is ON, so that gate pulse EY represents S1A and S1B. When signal SX is generated, inverter 15 converts the DC current Idc from rectifier 12 into an AC output current Iac according to gate pulse EY (=S3A, S3B).

In the FIG. 3 embodiment, since AC current Iac corresponds to DC current Idc and the magnitude of Idc depends on the current reference Iref=S2, the magnitude of Iac can be optionally determined by S2. Further, the peak potential (or amplitude) of signal S2 is so selected that the magnitude of AC output current Iac ensures a sufficient starting torque for the induction motor 16. Also, the frequency of signal S2 is so selected that the magnitude of DC current Idc is reduced to zero (or a relatively small value) at every phase angles of 60 degrees of the AC output. In addition, the generation timing of pulses S3A and S3B is so determined that the leading and trailing edges of each of pulses S3A and S3B appear at the zero (or reduced) current portions of DC current Idc.

The operation of the FIG. 3 embodiment, under the generation of signal SX, will be described below with reference to FIGS. 5A to 5E and to FIGS. 6A to 6E. FIGS. 5A to 5E show waveforms of signals relevant to the explanation for a current control. FIGS. 6A to 6E respectively show the ON/OFF states of GTOs in the inverter 15 and illustrate typical current paths (the path of a current flow is indicated by solid lines).

In FIGS. 5A to 5E, each time interval of t1 to t3, t5 to t6 and t8 to t10 denotes a current reference zero interval (Iref=S2=0). DC current Idc flows in response to S2 (FIG. 5A) and S3A (FIG. 5C). Current feedback signal Ifbk (FIG. 5B) is obtained in response to DC current Idc. From time t1 to t2, no DC current flows (FIG. 6A). The time lag of pulse S3A from t1 to t2 can be adjusted by the delay time of delay circuit 448 in FIG. 3C. The leading edge of pulse S3A at time t2 (which appears within the current reference zero interval) renders a specific GTO of inverter 15 conductive. However, AC current Iac does not start to flow immediately after the generation of pulse S3A because of a circulating current in a preceding current supply mode. Current Iac starts to flow at time t3 and gradually increases thereafter (FIG. 5E). Such a current supply mode of time t3 to t4 is shown in FIG. 6B. (In FIG. 6B, it is assumed that gate pulse S3A triggers the GTO 151.)

In the current supply mode of FIG. 6B, a part of DC current Idc charges capacitor 14 in FIG. 3. The remaining part of current Idc flows through GTO 151 to windings R and S of induction motor 16, and it returns via GTO 154 to the DC circuit. However, due to the preceding current supply mode, a circulating current also flows through the closed current path of winding T - winding S - GTO 154 - diode 256. This circulating current disappears after time t4. From time t4 to t5, the current path only exists in the path of GTO 151 winding R - winding S - GTO 154. During the current reference zero interval of t5 to t6, AC current Iac gradually decreases.

At time t6, GTO 154 is rendered nonconductive while GTO 156 is rendered conductive. Then, current Iac again gradually increases after time t6. Such a current supply mode of time t6 to t7 is shown in FIG. 6C. In the current supply mode of FIG. 6C, DC current Idc flows through GTO 151 to windings R and T of motor 16, and it returns via GTO 156 to the DC circuit. From time t7 to t8, the current path only exists in the path of GTO 151 - winding R - winding T - GTO 156. During time from t8 to t9 within the current reference zero interval, AC current Iac gradually decreases.

At time t9, GTO 151 is rendered nonconductive by pulse S3B (FIG. 5D). In this case, as shown in FIG. 6D, only a circulating current flows along the path of winding R - winding T - GTO 156 - diode 252 (from time t9 to t10). From time t10 to t11, the current path is formed in the path of GTO 153 - winding S - winding T GTO 156 as shown in FIG. 6E, and the circulating current gradually decreases to zero by time t11.

As will be seen from the above discussion, the AC current Iac flowing through the winding R of motor 16, or the AC current for one phase (R) of the 3-phase load 16, has a waveform as shown in FIG. 5E. Slight changes may appear in the waveform due to variations in current reference zero interval and/or in circulating current mode, but the AC current Iac substantially retains a rectangular waveform with a 120-degree phase angle. (Although a long period for the circulating current mode results in extending the current flowing period of Iac, since the current reference zero interval depends on the AC output frequency, if the frequency detecting threshold point of low frequency detecting 41 is set at low, the influence of the change in the waveform of Iac can be practically avoided.)

According to the above-mentioned embodiment, the conduction interval (t3 to t11 in FIG. 5E) of AC output current Iac corresponds to the sum of the circulating current mode interval (t9 to t11 in FIG. 5E) and the continuous conducting interval (t2 to t9 in FIG. 5C) of pulse S3A, and the continuous conducting interval of pulse S3A is nearly equal to the phase angle of 120 degrees. From this, if the circulating current mode interval is fairly short, an AC output current Iac having a quasi square waveform with a phase angle of almost 120 degrees is obtained. Thus, the FIG. 3 embodiment functions as a voltage-source inverter.

In the FIG. 3 embodiment, although a part of DC current Idc is used to charge the capacitor 14 in the filter circuit, a square waveform with nearly 120-degree phase angle is obtained for one phase of an AC output current. Accordingly, an excellent starting characteristic can be expected as that obtained in a current-source inverter.

In the FIG. 3 embodiment, current reference circuit 42 is used as a current control means for intermittently reducing the DC current to substantially zero. However, such a means may be assigned to voltage control circuit 25. (In this case, the circuit elements 42 and 43 may be deleted.) Thus, at the time of starting of the motor, when a detection signal SX is supplied from detector 41 to circuit 25, circuit 25 generates a pulsate current reference signal E25 having a waveform similar to signal S2. Then, this pulsate signal E25 is used for a current reference signal Iref. When the signal SX disappears, circuit 25 delivers signal E25 with a continuous potential. Then, this continuous signal E25 is used for the Iref.

FIG. 3D shows a modification of the embodiment in FIG. 3. According to the FIG. 3 embodiment, the frequency of the AC output is indirectly detected by detector 41 in accordance with the potential of frequency reference signal Fref. On the contrary, in the FIG. 3D embodiment, the frequency of the AC output is directly detected by a low frequency detector 41X in accordance with the potential of AC output voltage Vac. Detector 41X may have a circuit configuration as shown in FIG. 3A. FIGS. 3E to 3H show waveforms explaining the operation of the FIG. 3D embodiment.

In FIG. 3D, voltage signal E23 from potential transformer 23 is inputted to the detector 41X as shown in FIG. 3A. (A latch circuit for retaining the logic level of signal SX may be further provided after inverter 416, as the case may be.) The rotation speed of motor 16 depends on the frequency of AC voltage Vac, and the amplitude of voltage Vac depends on the rotation speed of motor 16. Accordingly, the AC output frequency of inverter 15 can be detected from the amplitude of signal E23. (In general, the potential of frequency reference signal Fref is substantially proportional to the amplitude of signal E23 as shown by the broken line in FIG. 3I.) The potential of signal E23 is compared with a comparison potential EcompX.

When the potential of E23 falls below the potential EcompX, detector 41X delivers a detection signal SX with logic "0" (FIGS. 3E and 3H). In this case, switch 43 of FIG. 3D selects a pulsate signal S2 for the current reference Iref (FIG. 3G), and switch 45 selects a set of pulses S3A and S3B for the gate pulse EY. This corresponds to the case of FIG. 3 in which the potential of E22 is lower than the comparison potential Ecomp (FIG. 3F). When the potential of E23 exceeds the potential EcompX, detection signal SX disappears (logic "1" in FIG. 3H). In this case, switch 43 selects a continuous signal E25 for the current reference Iref (FIG. 3G), and switch 45 selects a set of pulses S1A and S1B for the gate pulse EY. This corresponds to a case wherein the potential of E22 is higher than the comparison potential Ecomp (FIG. 3F).

According to the embodiment of FIGS. 3 or 3D, since a 120-degree phase angle AC current Iac having a square-like waveform can be obtained for each of three phases of 3-phase induction motor 16, a sufficient starting torque TQ for the motor 16 is ensured (FIG. 3I).

Figure 7:
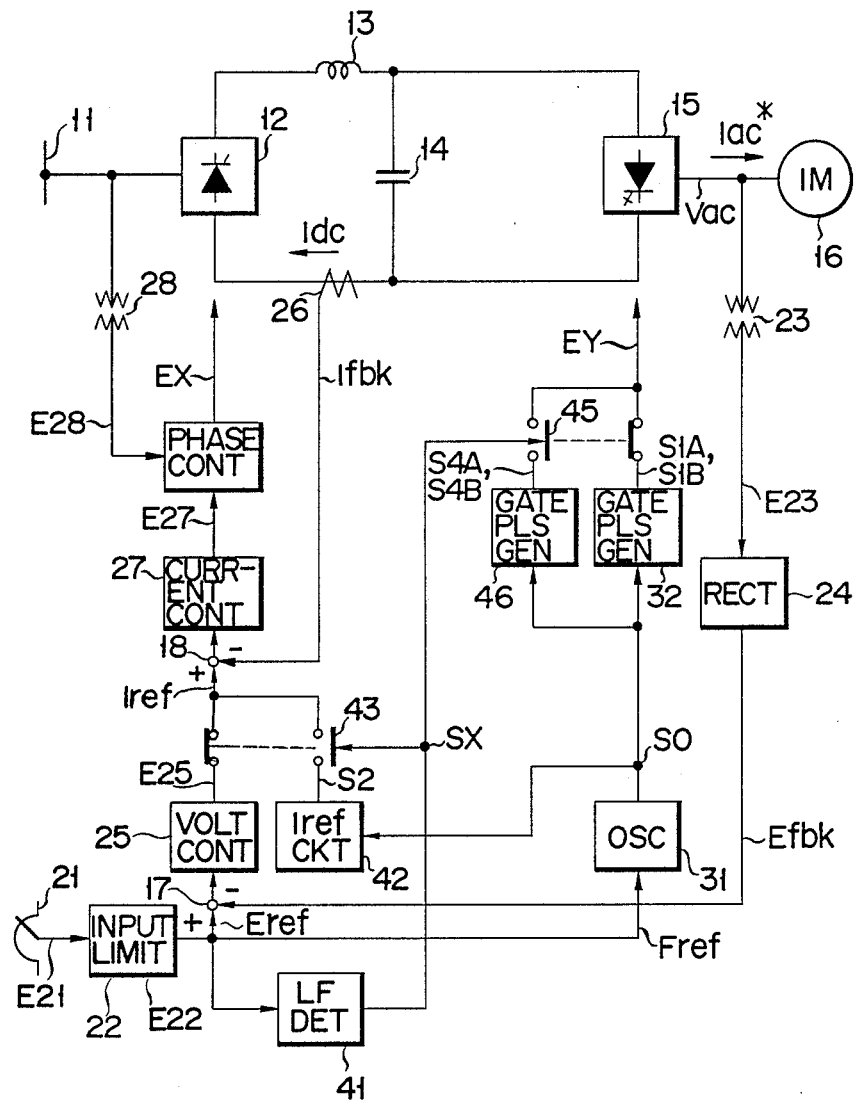
FIG. 7 shows a second embodiment of the present invention.

FIG. 7 shows a second embodiment of the present invention. The FIG. 7 embodiment differs from the FIG. 3 embodiment in one point. That is, a gate pulse generator 46 is used in place of the gate pulse generator 44 of FIG. 3.

Figure 7A:
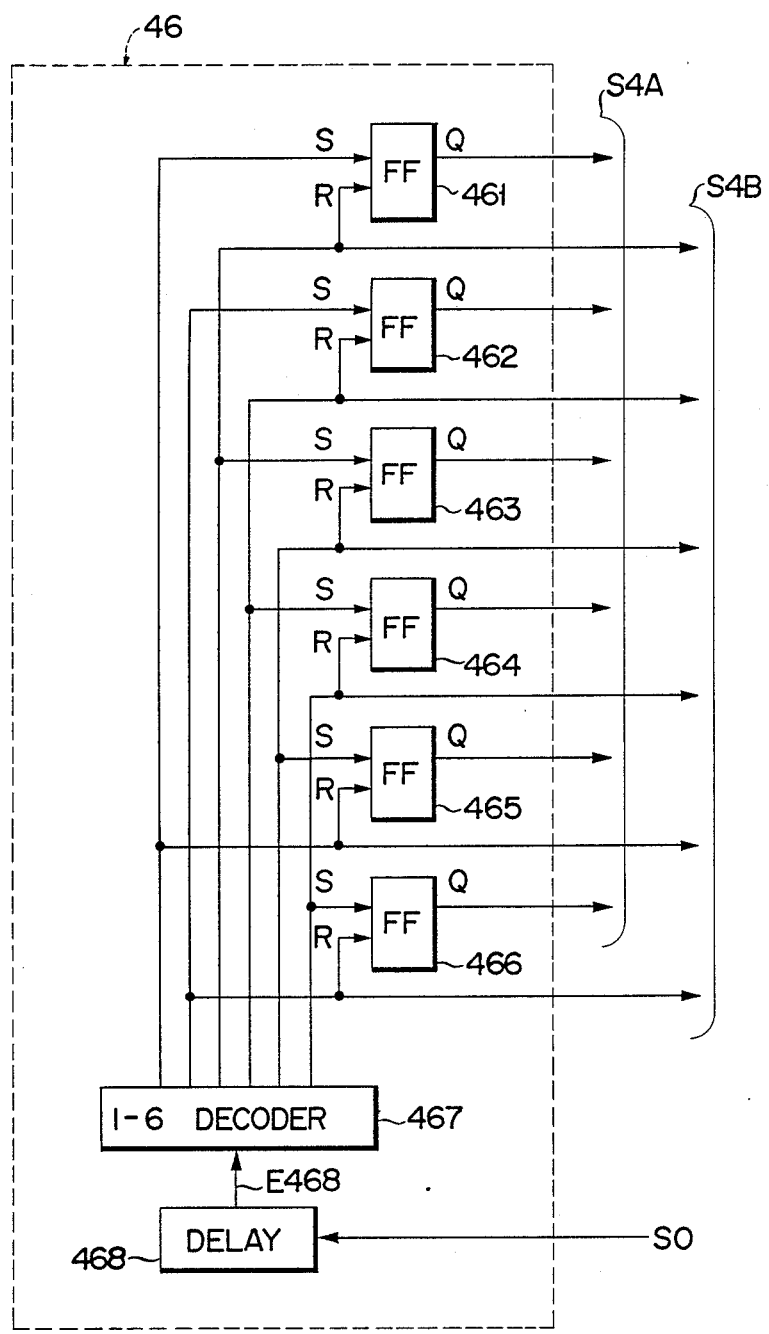
FIG. 7A shows details of a gate pulse generator 46 in the embodiment of FIG. 7.

Details of generator 46 are shown in FIG. 7A. Gate pulse generator 46 is provided to receive the signal S0 from oscillator 31. As shown in FIG. 7A, generator 46 may be made of a flip-flop circuit. In this flip-flop circuit, the leading edge of signal S0 is delayed through a delay circuit 468 and changed to a signal E468. Signal E468 is decoded into first to sixth pulses by an 1-6 decoder 467. The first pulse from decoder 467 sets a flip-flop 461 and resets a flip-flop 465. The second pulse from decoder 467 sets a flip-flop 462 and resets a flip-flop 466. The third pulse from decoder 467 sets a flip-flop 463 and resets flip-flop 461. The fourth pulse from decoder 467 sets a flip-flop 464 and resets flip-flop 462. The fifth pulse from decoder 467 sets flip-flop 465 and resets flip-flop 463. The sixth pulse from decoder 467 sets flip-flop 466 and resets flip-flop 464. Six outputs from flip-flops 461 to 466 jointly constitute a gate pulse S4A, and six decoded signals from decoder 467 jointly constitute a gate pulse S4B.

FIGS. 8A to 8E show waveforms appearing in the configuration of the FIG. 7 embodiment. In response to signal S0 (FIG. 8A), generator 46 generates a set of pulses S4A and S4B (FIGS. 8D and 8E). Pulse S4A is formed with two-series sub-pulses each of which conducting interval is nearly equal to the phase angle of 60 degrees (FIGS. 8D). Thus, the total pulse width of S4A substantially corresponds to the phase angle of 120 degrees. Pulse S4B has a narrow pulse width and is generated at the trailing edge of each of the sub-pulses in pulse S4A (FIG. 8E). Pulse S4A renders the GTO of inverter 15 conductive, while pulse S4B renders the GTO of inverter 15 nonconductive.

As seen from FIG. 8D, pulse S4A contains at its center a narrow nonconducting period. The key feature of the FIG. 7 embodiment resides in this center nonconducting period in pulse S4A.

The set of pulses S4A and S4B is supplied as gate pulse EY to inverter 15 via dual switch 45. Inverter 15 converts a DC current Idc from rectifier 12 into an AC output current Iac* according to the gate pulse EY (=S4A, S4B). Since AC current Iac* corresponds to DC current Idc and the magnitude of Idc depends on a current reference Iref (=S2), the magnitude of Iac* can be optionally determined by S2.

Figure 10A:
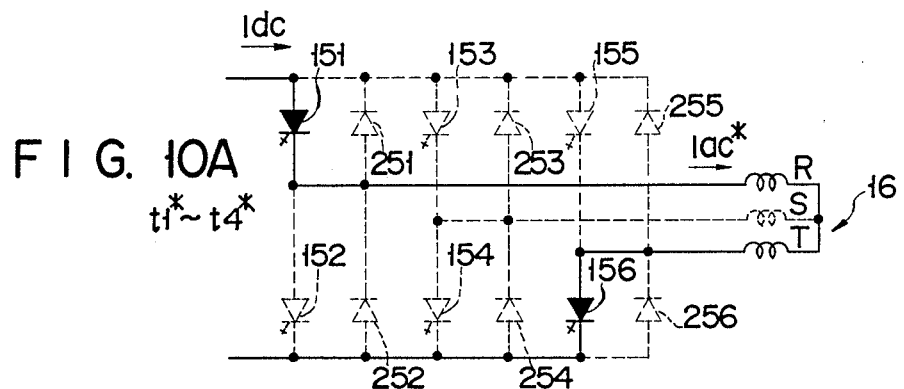
FIGS. 10A to 10C respectively show the ON/OFF states of GTOs in the inverter 15 of the FIG. 7 embodiment.
Figure 10B:
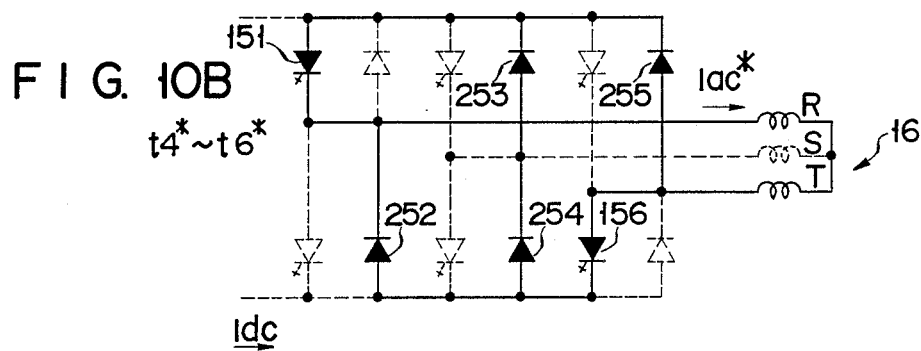
Figure 10C:
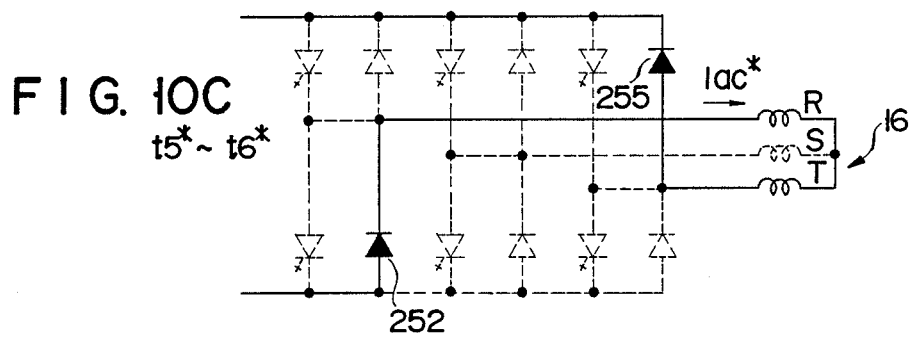

FIGS. 9A to 9E show waveforms explaining the operation of the FIG. 7 embodiment. FIGS. 10A to 10C show the ON/OFF states of GTOs in the inverter 15 of FIG. 7.

In the FIG. 7 embodiment, the supply of AC current Iac* is completed for every phase angles of 60 degrees. According to the FIG. 7 embodiment, capacitor 14 has been charged by reactive energy in a preceding current supply mode, and the leading edge of pulse S4A (at time t1* in FIG. 9C) precedes the trailing edge of the corresponding DC current zero interval (at time t2* in FIG. 9B). When pulse S4A is generated at time t1*, capacitor 14 is discharged so that AC current Iac* starts to flow (time t1* in FIG. 9E). This current supply mode is shown in FIG. 10A. An AC current component corresponding to the DC current flowing after time t2* (FIG. 9B) is superposed onto an AC current component corresponding to the capacitor discharging current. From this, the waveform of AC current Iac* exhibits at its leading edge a temporary overshoot as shown in FIG. 9E.

At time t3*, the potential of signal S2 (=Iref) becomes zero (FIG. 9A) so that DC current Idc starts to decrease (FIG. 9B). DC current Idc becomes zero at time t4*. After completion of the discharge of capacitor 14, a circulating current flows through the solid line in FIG. 10B. At time t5*, conducting pulse S4A disappears (FIG. 9C) while nonconducting pulse S4B (FIG. 9D) is supplied to GTOs 151 and 156 (FIG. 10B). These GTOs are immediately rendered nonconductive by pulse S4B, thereby allowing the capacitor 14 to be charged by reactive energy stored in windings R and T of motor 16 (current supply mode in FIG. 10C).

In the current supply mode of FIG. 10C, the reactive energy is not dissipated. Therefore, this mode is finished in a fairly shorter time than in the corresponding circulating mode in the FIG. 3 embodiment. The current supply of Iac* for the former sub-pulse of S4A with 60-degree phase angle is completed at time t6*. The current supply of Iac* for the latter sub-pulse of S4A is similarly executed.

According to the FIG. 7 embodiment, a quasi square waveform AC output current Iac* with a 120-degree phase angle can be obtained. Although current Iac* includes a slight nonconducting period at its center, such a nonconducting period invites no practical problem. Further, although a relatively large discharge current flows from capacitor 14 at the leading edge of current Iac*, this discharge current rather improves the leading (rising) edge waveform of Iac*. Also, at the end of supply of AC current Iac*, the reactive energy from induction motor (AC load) 16 is absorbed by capacitor 16 in a short time. Consequently, an AC output current with an excellent waveform can be expected.

In addition, since the capacitance of capacitor 14 which reserves reactive energy of a voltage-source inverter is generally selected to be a large value, generation of an excessive high DC voltage due to the reactive energy hardly occurs. Even in a case where the capacitance of capacitor 14 is selected to be a small value in a special application, an excessive high DC voltage can be avoided by slightly lagging the generation of nonconducting pulse S4B. This is because, since a part of reactive energy to be absorbed by capacitor 14 is dissipated in a circulating current mode by circuit elements of the power converter before the generation of pulse S4B, the amount of a circulating current appearing after the generation of pulse S4B is decreased.

As another method for suppressing the above excessive high DC voltage, a diode clipper being formed with a diode rectifier connected to a capacitor may be coupled to the DC input of inverter 15. According to this method, a circuit operation which provides an equivalently increased capacitance to capacitor 14 is obtained. Reactive energy absorbed by the capacitor in the diode clipper is then dissipated by another means such as a resistor or the like.

Figure 11:
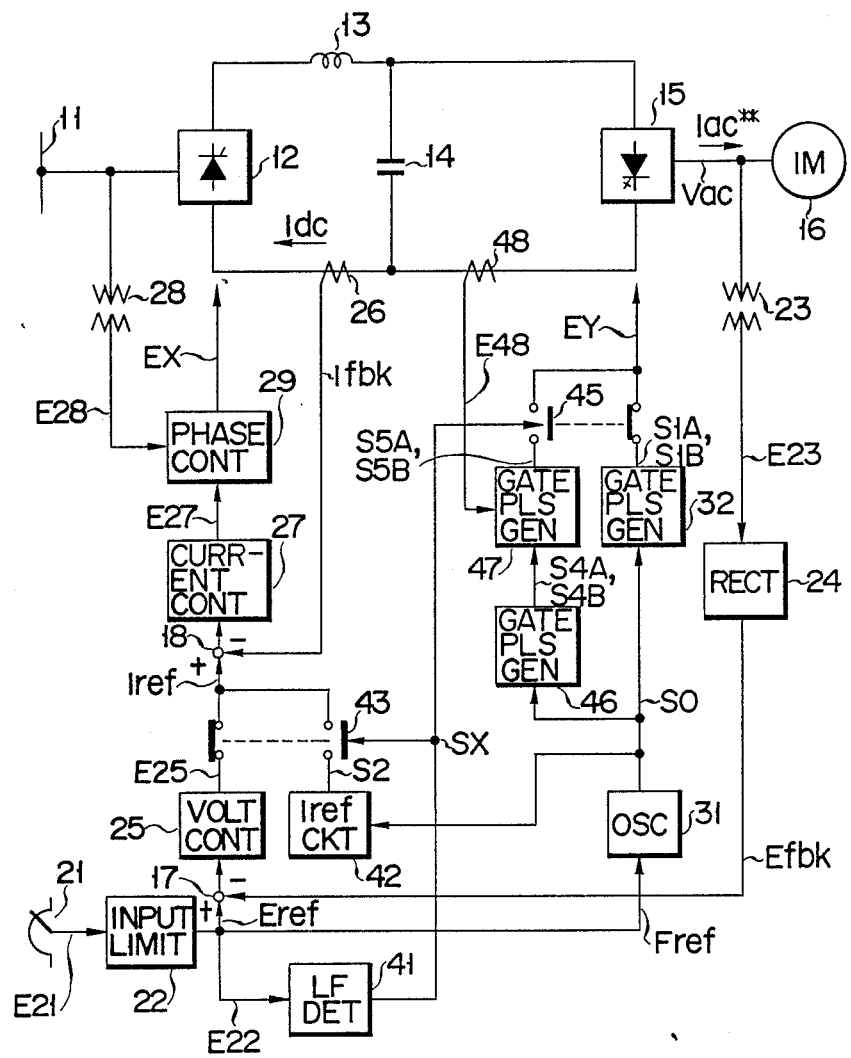
FIG. 11 shows a third embodiment of the present invention.

FIG. 11 shows a third embodiment of the present invention. The FIG. 11 embodiment differs from the FIG. 7 embodiment in one point. That is, a gate pulse generator 47 is provided between switch 45 and generator 46, and a current transformer 48 is provided on the discharging current path of capacitor 14.

Figure 11A:
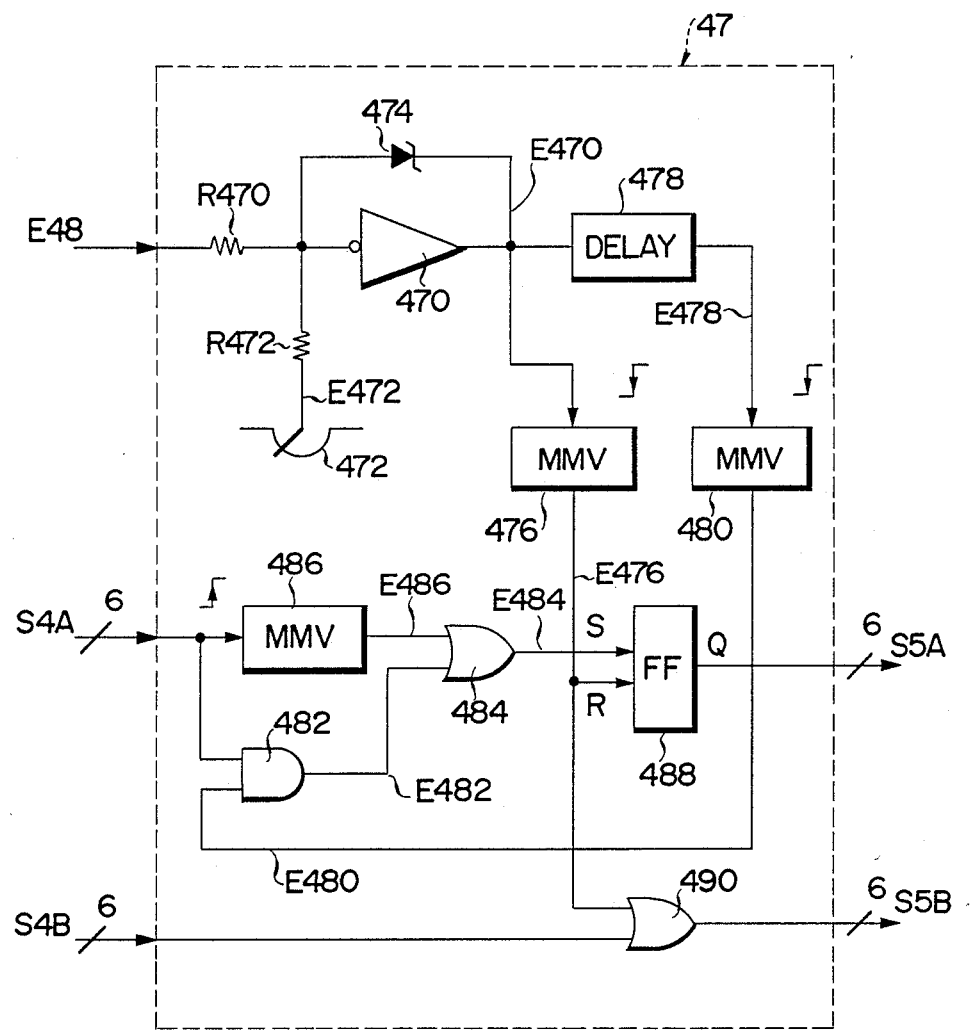
FIG. 11A shows details of a gate pulse generator 47 in the embodiment of FIG. 11.

Details of gate pulse generator 47 are shown in FIG. 11A. Generator 47 receives a discharging current signal E48 from current transformer 48. Signal E48 contains information of the amount of a discharging current from capacitor 14. Signal E48 is supplied via a resistor R470 to the inverted input of an operational amplifier 470. The inverted input of amplifier 470 receives via a resistor R472 a comparison potential E472 from a potentiometer 472. The output of amplifier 470 is coupled via the cathode-anode path of a Zener diode 474 to the inverted input thereof. Amplifier 470 serves as a rectifier with an input threshold defined by potential E472. Amplifier 470 rectifies the inputted signal E48 representing the discharge current from capacitor 14, and generates a rectangular signal E470 with a given positive potential. The falling edge of signal E470 triggers a monostable multivibrator (MMV) 476. When triggered by signal E470, MMV 476 generates a pulse E476 for a given period of time. Signal E470 from amplifier 470 is slightly delayed through a delay circuit 478. The falling edge of a delayed signal E478 from delay circuit 478 triggers an MMV 480. When triggered by signal E478, MMV 480 generates a pulse E480 for a given period of time.

Pulse S4A from generator 46 is supplied to an MMV 486 and to one input of an AND gate 482. The rising edge of pulse S4A triggers MMV 486 so that a pulse E486 with a given narrow width is generated. The other input of AND gate 482 receives the pulse E480 from MMV 480. An ANDed output E482 from gate 482 is supplied to one input of an OR gate 484. The other input of OR gate 484 receives the pulse E486 from MMV 486. An ORed output E484 from gate 484 is supplied to a set input of a flip-flop 488. A reset input of flip-flop 488 receives the pulse E476 from MMV 476. Flip-flop 488 is set by the rising edge of output E484 and is reset by the rising edge of pulse E476. During the set state, a Q output of flip-flop 488 generates a conducting pulse S5A. Pulse E476 is also supplied to one input of an OR gate 490. The other input of OR gate 490 receives pulse S4B from generator 46. An ORed output from gate 490 becomes a nonconducting pulse S5B.

Although FIG. 11 illustrates by a single line the circuit of each of pulses S4A, S4B, S5A and S5B for the sake of simplicity, six independent signal lines as well as six sets of the circuit elements 482 to 490 are provided for each of pulses S4A, S4B, S5A and S5B. Pulses S5A and S5B obtained from generator 47 serve to control the value of the discharge current from capacitor 14, so that the value of the discharge current does not exceed a predetermined value.

The operation of the FIG. 11 embodiment will be described with reference to FIGS. 12A to 12G. The operation of the FIG. 11 embodiment for the interval of t4 to t7 differs from the corresponding interval of the FIG. 7 embodiment. When conducting pulse S4A is generated (at time t3 in FIG. 12C), the head portion of conducting pulse S5A is immediately generated (at time t3 in FIG. 12F). If GTO 151 (FIG. 10A) retains a continuous conduction after time t3**, the waveform of AC output current Iac* contains an overshoot as shown by the broken line in FIG. 12E. However, such a overshoot is eliminated by the circuit operation of gate pulse generator 47 (FIG. 11A).

The comparison potential E472 in FIG. 11A defines a predetermined value Iaco of an AC current Iac from inverter 15. When the potential of signal E48 from current transformer 48 reaches or exceeds the comparison potential E472, nonconducting pulse S5B is generated (at time t4 FIG. 12G) so that GTO 151 (FIG. 10A) is turned-off. Thereafter, the converter enters the circulating current mode or reactive energy absorbing mode, and the amount of current Iac is reduced (after time t4 in FIG. 12E). After elapsing a predetermined period of time, conducting signal S5A is again generated (at time t5 in FIG. 12F) to turn-on the GTO 151. When the E48 potential again reaches the E472 potential, pulse S5B is again generated (at time t6 FIG. 12G) so that GTO 151 is turned-off. Thereafter, signal S5A is again generated (at time t7** in FIG. 12F) to turn-on the GTO 151.

After elapsing a certain period of time, the voltage developed from the discharging of capacitor 14 is balanced with the voltage drop in the DC current path.

Then, the amount of AC current Iac** becomes close to the predetermined value Iaco which corresponds to the amount of DC current Idc. Thereafter, the circuit operation of the FIG. 11 embodiment becomes substantially identical to the circuit operation of the FIG. 7 embodiment.

As described above, according to the FIG. 11 embodiment, while avoiding influence of a discharge current from capacitor 14 at the start of current supply, the same effect as that obtained in the FIG. 7 embodiment can be enjoyed. Namely, the waveform of an AC output current obtained by the FIG. 7 embodiment is substantially the same as that obtained in a current-source inverter. Accordingly, an excellent starting characteristic can be expected from the FIG. 11 embodiment.

Figure 11B:
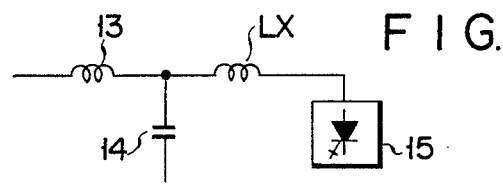
FIG. 11B shows a partial modification of the FIG. 11 embodiment.

For the FIG. 11 embodiment, it is preferable to insert a proper impedance element (e.g., a reactor LX with a small inductance, as shown in FIG. 11B) in the discharge current path of capacitor 14. Of course, the line impedance of the discharge current path may be utilized to such an impedance. The advantageous effect of the FIG. 11 embodiment (overshoot suppressing for Iac) can be readily obtained by the insertion of such an impedance. This is because the peak value of the discharge current is suppressed by this impedance. When the above impedance is employed, even if the number of commutation times to make the GTOs conductive or nonconductive within the period from t3 to t7** (FIGS. 12F, 12G) is reduced, a substantial advantage of the FIG. 11 embodiment can be obtained. (If the above impedance is employed, the number of commutation times may be even zero as the case may be.)

Figure 25A:
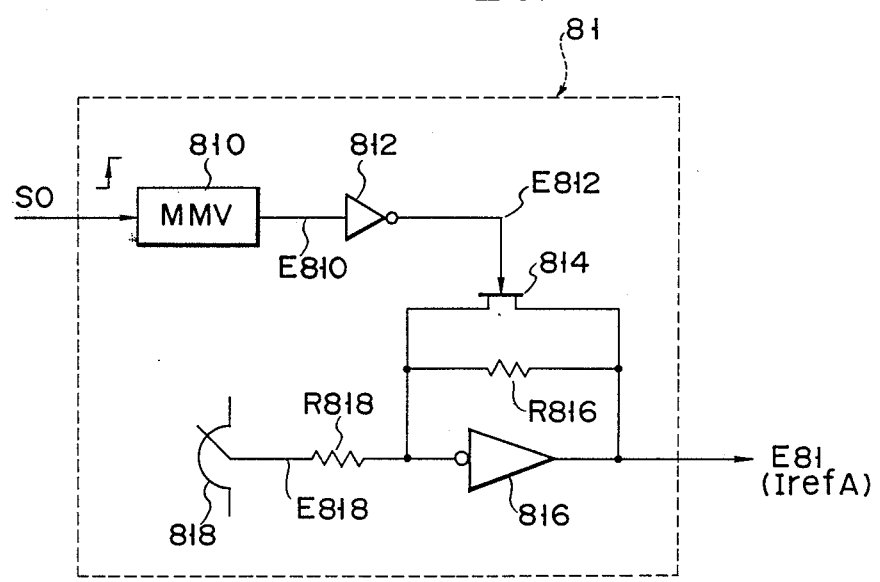
FIG. 25A shows details of a current reference circuit 81 in the embodiment of FIG. 25.
Figure 25:
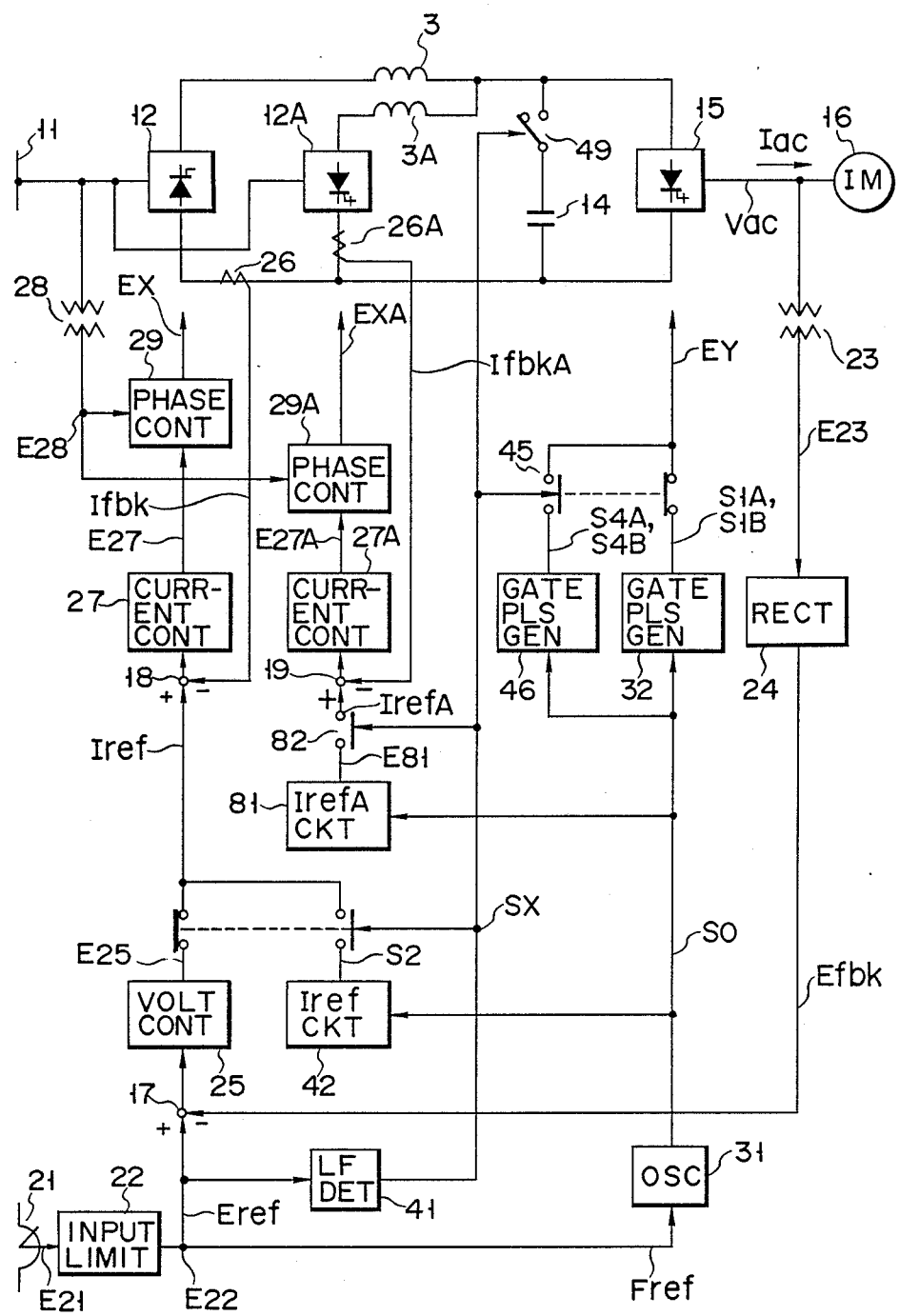
FIG. 25 shows an eighth embodiment of the present invention.

As another means for suppressing the influence of a discharge current from capacitor 14, a regenerator for regenerating the energy stored at capacitor 14 to AC power line 11 may be utilized (cf. FIG. 25 embodiment). Or, a semiconductor shunt switch for temporarily short-circuiting the DC line of a voltage-source inverter may be used for discharging the capacitor 14 in order to avoid the influence of the discharge current from capacitor 14 (cf. FIG. 22 embodiment). It is evident that the same or better advantage as that obtained in the FIG. 11 embodiment is derived by the use of above means or by applying them to the FIG. 11 embodiment.

As may be seen from the above description, according to an embodiment of the invention for a voltage-source inverter, it is possible to provide an AC output current with an excellent waveform which is obtainable only from a current-source inverter. Accordingly, the power converter according to an embodiment of the invention provides the following features.

(1) At the time of start of a load induction motor, an AC current having a square waveform with substantially 120-degree phase angle is allowed to flow through the motor. From this, the magnitude of the starting torque for the motor can be enhanced to a large value corresponding to the capacity of the power converter.

(2) At the time of start of the motor (load), the amount of an AC current is governed by a DC current control loop (the loop of circuit elements 26 - 18 - 27 - 29 - 12). Accordingly, the AC current is stably controlled independently of the load condition and an excessive AC current can be avoided.

(3) There is no need to reserve unnecessary allowance for an AC output current because the AC current is stably controlled independently of the load condition. Accordingly, the capacity of the power converter can be minimized, thereby providing an economical power converter.

(4) The characteristic of a voltage-source inverter in normal operation is not spoiled by the current control operation at the start of a load (motor), so that the power converter can operate as a practically ideal power source.

(5) The number of commutation times can be fairly reduced as compared with a PWM control. Accordingly, the power converter of the invention has a high power-conversion efficiency.

Figure 13:
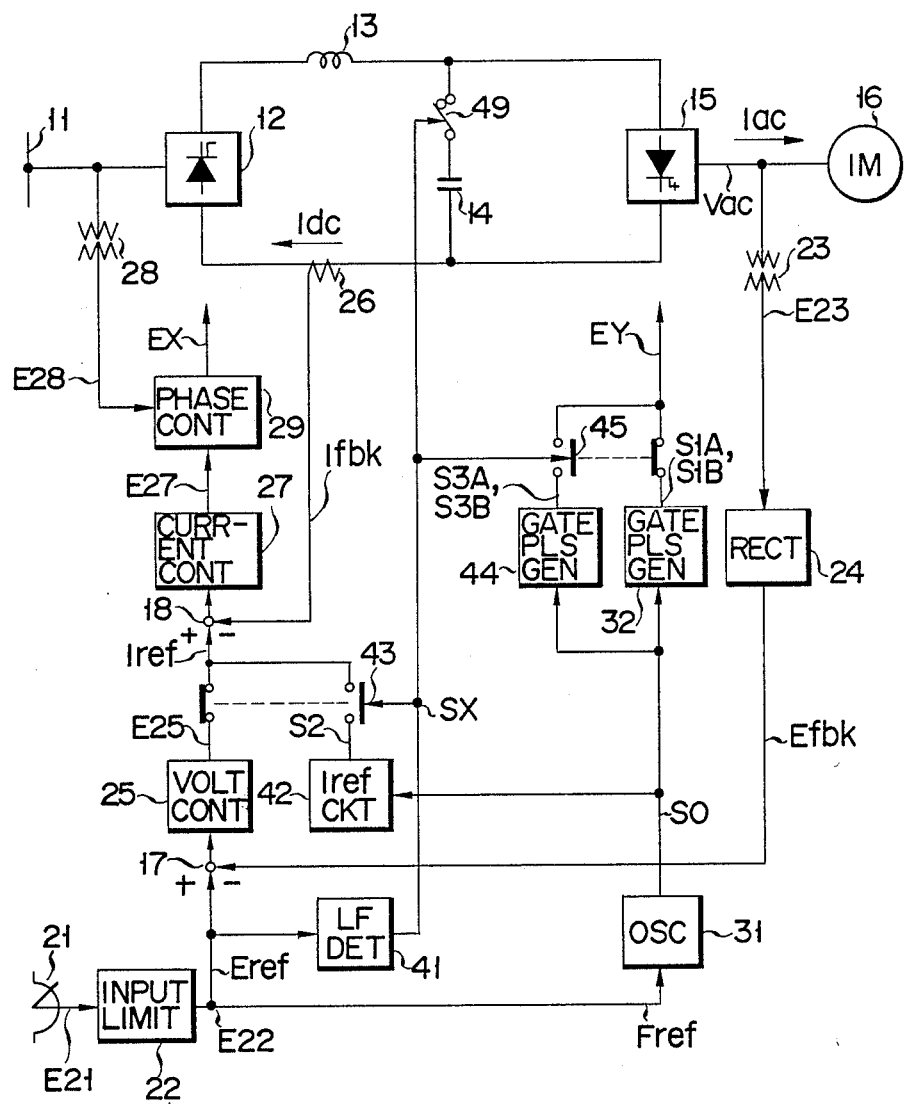
FIG. 13 shows a fourth embodiment of the present invention.

FIG. 13 shows a fourth embodiment of the present invention. The FIG. 13 embodiment differs from the FIG. 3 embodiment in one point. That is, a switch 49 is connected in series to capacitor 14. Switch 49 releases capacitor 14 from the DC circuit of the power converter in response to the signal SX from low frequency detector 41. Thus, the DC line of the power converter is free from the capacitor 14 at the time of starting of the load (motor) 16. FIGS. 14A to 14F show waveforms appearing in the configuration of FIG. 13.

Current reference signal S2 (FIG. 14D) becomes zero for a certain period of time in response to signal S0 (FIG. 14A) and, thereafter, signal S2 reaches a current reference level (Iref) which represents the magnitude of an AC output current necessary for the starting operation. Signal S1A (FIG. 14B) serves as a current supplying signal with a phase angle of 180 degrees. Signal S1B (FIG. 14C) appearing at the trailing edge of signal S1A serves as a current stopping signal with a narrow width. Signal S3A (FIG. 14E) serves as a current supplying signal with a phase angle of about 120 degrees. Signal S3B (FIG. 14F) appearing at the trailing edge of signal S3A serves as a current stopping signal with a narrow width. The potential change of each of signals S3A and S3B occurs at the zero interval of signal S2.

The operation of the FIG. 13 embodiment for a case wherein signal SX is generated and switch 49 is turned-off, will be mentioned below with reference to FIGS. 15A to 15E and FIGS. 16A to 16H. In FIGS. 15A to 15E, timings among signals S2, Ifbk, S3A, S3B and Iac are illustrated. FIGS. 16A to 16H respectively illustrate typical current supply modes, in which the current path is indicated by solid lines.

Figure 16A:
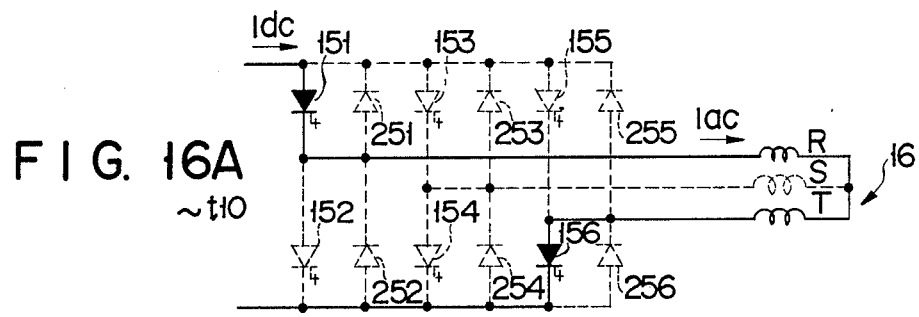
Figure 16B:
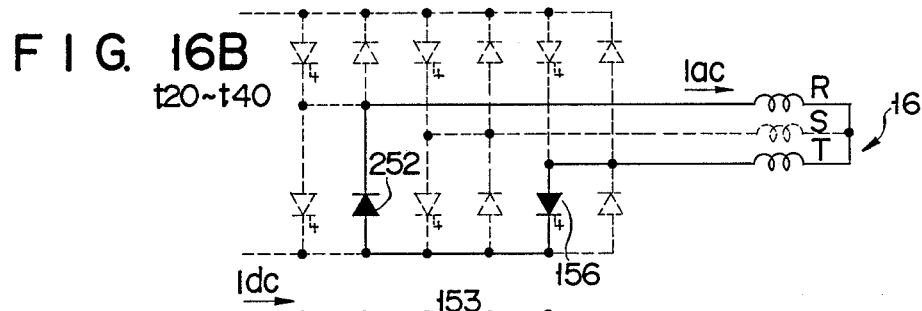

In FIGS. 15A to 15E, the intervals of t10 to t40, t60 to t90, and t110 to t140 are the current reference zero interval. Current reference signal S2 (FIG. 15A) serves to flow a DC current Idc at intervals other than the current reference zero interval. The flow of DC current is detected by current feedback signal Ifbk (FIG. 15B). Signal S2 becomes zero at time t10 and then DC current Idc is gradually reduced to zero. However, when GTO 151 (FIG. 16A) is made nonconductive at time t20 (FIG. 16B), reactive energy stored in each phase of motor 16 is circulated along the current path of GTO 156, diode 252, R phase winding of motor 16 and S phase winding of motor 16 (FIG. 16B). From this, an AC current Iac from inverter 15 (FIG. 13) does not become zero at time t20. The time interval of the above circulating current flow is called as a circulating current interval hereinafter.

Figure 16C:
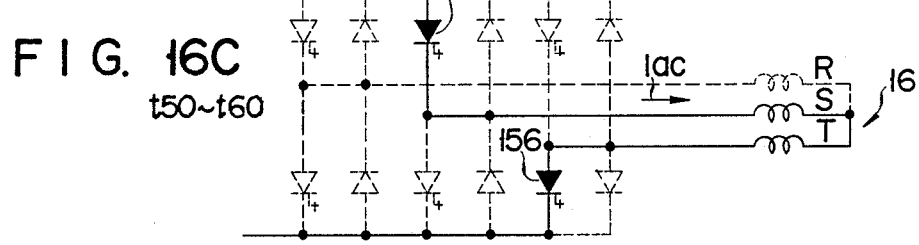

GTO 153 (FIG. 16C) is rendered conductive at time t50 in response to signal S3A (FIG. 15C). DC current Idc flows along the current path of GTO 153, winding S of motor 16, winding T of motor 16 and GTO 156 (FIG. 16C). This DC current Idc corresponds to AC output current Iac (FIG. 15E). When signal S2 becomes zero at time t60 (FIG. 15A), DC current Idc gradually reduces.

Figure 16D:
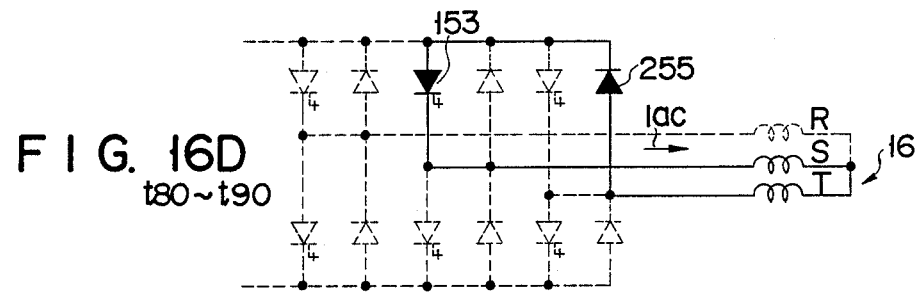

When a nonconducting signal is supplied to GTO 156 at time t80 and GTO 156 is rendered nonconductive, the circulating current flows along the current path of GTO 153, winding S of motor 16, winding T of motor 16 and diode 255 (FIG. 16D). When GTO 152 is rendered conductive at time t90, DC current Idc starts to flow along the current path of GTO 153, winding S, winding R and GTO 152 (FIG. 16E). Therefore, the current flowing through the winding S corresponds to the sum of DC current Idc starting to flow at time t90 and the circulating current shown in FIG. 16D. This state is illustrated in FIG. 16E. The circulating current of FIG. 16E is then reduced to zero, so that diode 255 becomes nonconductive (FIG. 16F). Signal S2 likewise becomes zero at time t110 (FIG. 15A) and DC current Idc is gradually reduced to zero.

GTO 153 is rendered nonconductive at time t130 in response to nonconducting signal S3B (FIG. 15D), and the current flowing state advances to the next circulating current interval (FIGS. 16G and 16H) which corresponds to the interval of t120 to t150 in FIG. 15E. The current flowing through winding S of motor 16 completely becomes zero at time t150.

When an attention is paid to the current flowing through the winding S of motor 16, the current starts flowing at time t40 and becomes zero at time t150 as shown in FIG. 15E. This current flowing interval corresponds to the phase angle of about 120 degrees. Although there is a slight variation in waveform of this interval, a quasi square-wave AC output current Iac is obtained in this interval. (The output current is substantially DC if slight circulating currents are disregarded.) Thus, a controlled square-wave current Iac is practically derived.

According to the FIG. 13 embodiment, since capacitor 14 is disconnected from the DC line of the power converter at the time of starting the load motor, the rising and falling speeds of the square waveform of AC current Iac are enhanced so that the waveform of Iac is improved. In other words, since the interval of circulating currents is superposed onto the conducting interval of signal S3A having about 120-degree phase angle, output current Iac may have an improved square waveform with 120-degree phase angle. From this, in spite of the arrangement of a voltage-source inverter, an excellent starting characteristic similar to that obtained by a current-source inverter can be expected.

Incidentally, in the FIG. 13 embodiment, a signal E25 having a waveform as shown in FIG. 15A may be generated from voltage control circuit 25, so that such a signal E25 is used for the current reference signal Iref at the time of starting the load motor 16.

FIG. 17 shows a fifth embodiment of the present invention. FIGS. 18A to 18E show waveforms appearing in the configuration of the FIG. 17 embodiment. The FIG. 17 embodiment differs from the FIG. 7 embodiment in two points. That is, a switch 49 as shown in the FIG. 13 embodiment is connected in series to capacitor 14, and a diode clipper 54 is connected in parallel to the series circuit of switch 49 and capacitor 14. In other words, the DC circuit of inverter 15 is shunted via diode clipper 54. Diode clipper 54 is formed with a diode 51, a capacitor 52 connected in series to diode 51 and a resistor 53 connected in parallel to capacitor 52. Resistor 53 serves to discharge capacitor 52.

The conduction interval of signal S4A (about 120 degrees in the phase angle) is about ⅔ of signal S1A (180 degrees) and has the nonconducting portion at its center (FIG. 18D). Nonconducting signal S4B appears at each trailing edge of conducting signal S4A (FIG. 18E). Signals S1A, S4A and S4B are synchronized with signals S0 and S2 (FIGS. 18A to 18E).

The operation of the FIG. 17 embodiment will now be described with reference to FIGS. 19A to 19E and FIGS. 20A to 20C.

Figure 20A:
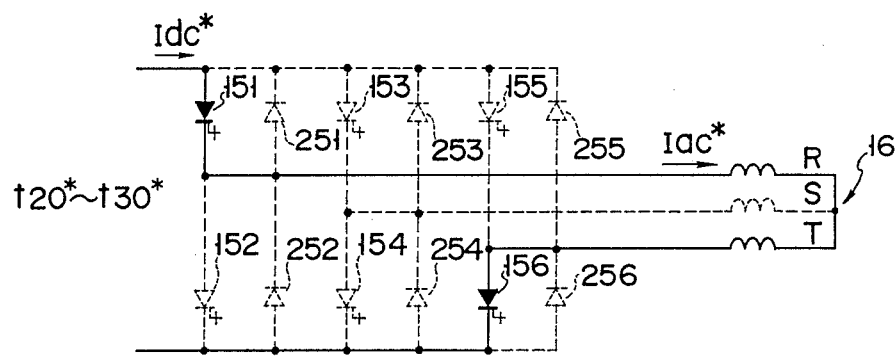
FIGS. 20A to 20C respectively show the ON/OFF states of GTOs in the inverter 15 of the FIG. 17 embodiment.
Figure 20B:
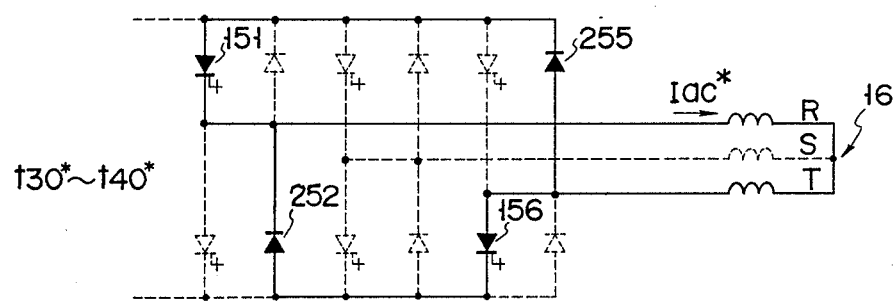

According to the FIG. 17 embodiment, the current supply is completed for every phase angles of about 60 degrees. A conducting signal S4A has already been generated at time t10* (FIG. 19C). When a current reference signal S2 (=Iref) is supplied at time t20* (FIG. 19A), a DC current Idc* (FIG. 19B) starts to flow in response to signal S2. This state is illustrated in FIG. 20A. When signal S2 becomes zero at time t30*, DC current Idc* gradually decreases and becomes zero at time t40*. However, an AC current Iac* (FIG. 19E) supplied to a load motor 16 does not immediately become zero at time t40* because of reactive energy stored in the winding of motor 16. At this time, a circulating current flows through windings R and T of motor 16, while keeping GTOs 151 and 156 as well as diodes 252 and 256 conductive (FIG. 20B). This circulating current flow starts from time t40*.

Figure 20C:
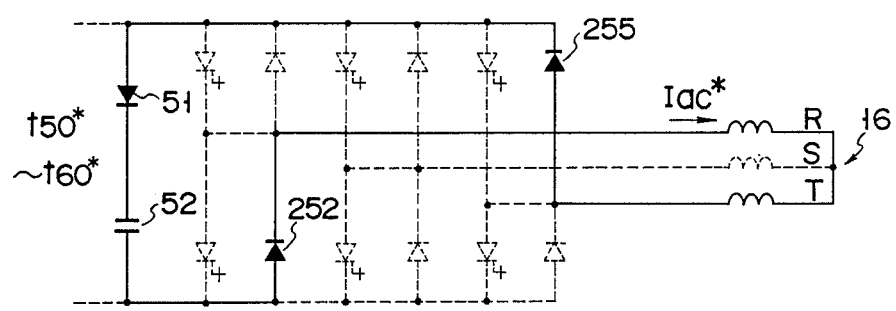

When nonconducting signal S4B (FIG. 19D) is supplied to GTOs 151 and 156 which are conducting at time t50*, GTOs 151 and 156 are immediately rendered nonconductive. Thus, the circulating current of the reactive energy is charged in capacitor 52 of the diode clipper through diodes 252, 256 and 51 (FIG. 20C). The reactive energy is completely charged in capacitor 52 at time t60*, and AC output current Iac* becomes zero. Capacitor 52 absorbs the reactive energy within the time interval of t50* to t60*. This state is illustrated in FIG. 20C. The reactive energy absorbed by capacitor 52 is discharged through resistor 53 and, thereafter, capacitor 52 becomes in a condition for again absorbing subsequent reactive energy.

In the FIG. 17 embodiment, the current supply starts at time t20* and is completed at time t60*. The next current supply for the 60-degree phase angle is similarly executed after time t70* (FIG. 19E).

According to the FIG. 17 embodiment, since the reactive energy is absorbed by capacitor 52, the current supply is finished in a fairly shorter time than the circulating current interval of the FIG. 13 embodiment. Further, according to the FIG. 17 embodiment, although a slight nonconducting portion appears at the center of the waveform of Iac* as shown in FIG. 19E, it is possible to obtain a quasi square waveform with 120-degree phase angle of the AC output.

In the FIG. 17 embodiment, a diode clipper is used to process the reactive energy. On the other hand, a sixth embodiment shown in FIG. 21 utilizes the capacitor 14 for processing the ineffective energy. The FIG. 21 embodiment differs from the FIG. 17 embodiment in that a diode 61 is connected in parallel to switch 49, so that diode 61 leads a current of reactive energy from motor 16 to capacitor 14 in a circulating current mode. This diode 61 circuit provides substantially the same effect as the diode clipper in the FIG. 17 embodiment. The configuration of FIG. 21 diode circuit is more simple than that of the diode clipper in FIG. 17. This is an additional advantage of the FIG. 21 embodiment.

Incidentally, the reactive energy absorbed by capacitor 14 may be further processed by a resistor connected in parallel to capacitor 14 or by a regenerator. (Such a resistor is shown by a dotted line in FIG. 21.)

Figure 22:
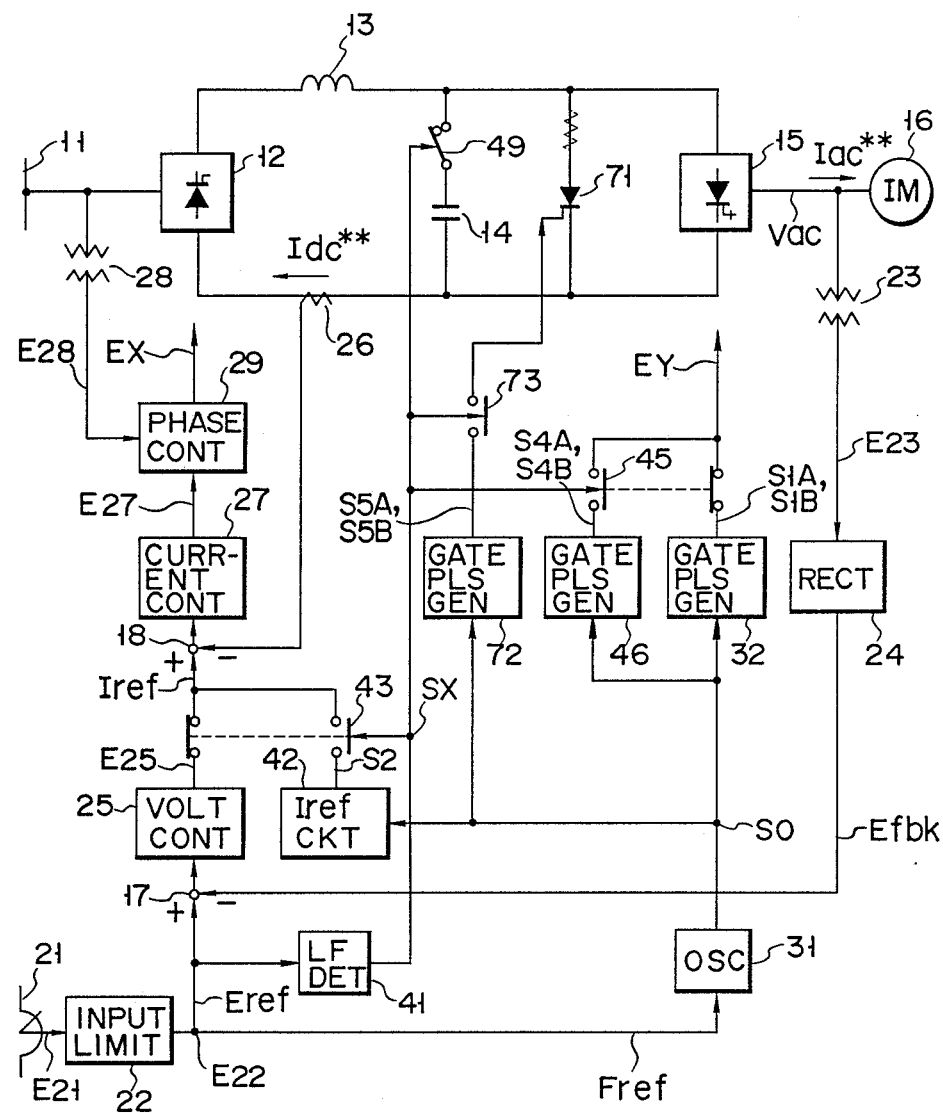
FIG. 22 shows a seventh embodiment of the present invention.

FIG. 22 shows a seventh embodiment of the present invention. FIGS. 23A to 23G show waveforms explaining the operation of the FIG. 22 embodiment. FIGS. 24A to 24D respectively show the ON/OFF states of GTOs in the inverter 15 of the FIG. 22 embodiment.

The FIG. 22 embodiment differs from the FIG. 17 embodiment in that a GTO 71 for temporarily shunting the DC circuit of the power converter is employed in place of the diode clipper in FIG. 17. Associated to GTO 71, a gate pulse generator 72 and a switch 73 are provided. Switch 73 is controlled by signal SX from detector 41 such that, when switch 49 is turned-off by signal SX, switch 73 is turned-on by signal SX.

Figure 22A:
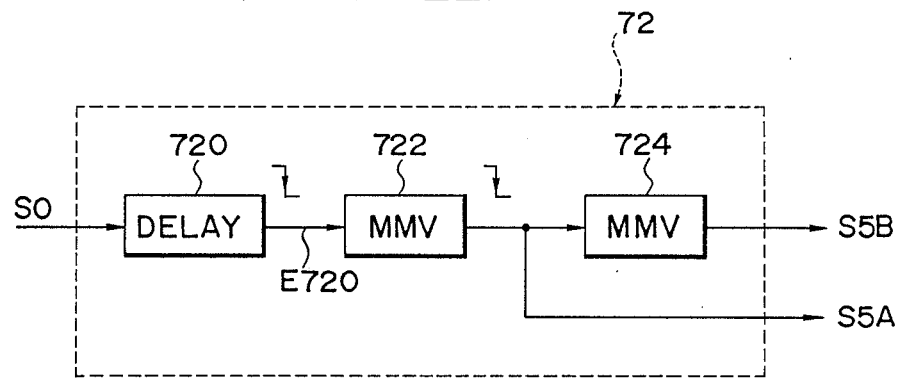
FIG. 22A shows details of a gate pulse generator 72 in the embodiment of FIG. 22.

FIG. 22A shows details of gate pulse generator 72. Generator 72 includes a delay circuit 720 which delays the signal S0 (FIG. 23A) from oscillator 31 and provides a delayed pulse E720. The delay time of circuit 720 corresponds to the time interval of t10 to t30 in FIG. 23E. The falling edge of pulse E720 triggers an MMV 722. Then, MMV 720 generates a turn-on pulse S5A (FIG. 23E). The falling edge (trailing edge) of pulse S5A triggers an MMV 724. Then, MMV 724 generates a turn-off pulse S5B (FIG. 23F). When switch 73 is turned-on by the generation of signal SX, turn-on pulse S5A from generator 72 renders the GTO 71 conductive and turn-off pulse S5B therefrom renders the GTO 71 nonconductive.

The FIG. 22 embodiment will operate as follows.

Figure 24A:
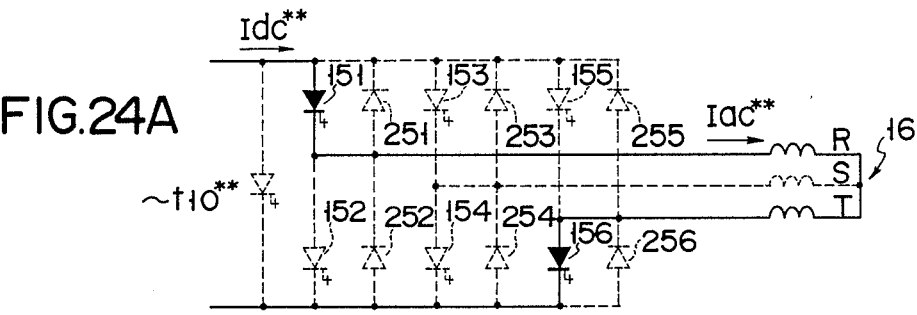
FIGS. 24A to 24D respectively show the ON/OFF states of GTOs in the inverter 15 of the FIG. 22 embodiment.
Figure 24B:
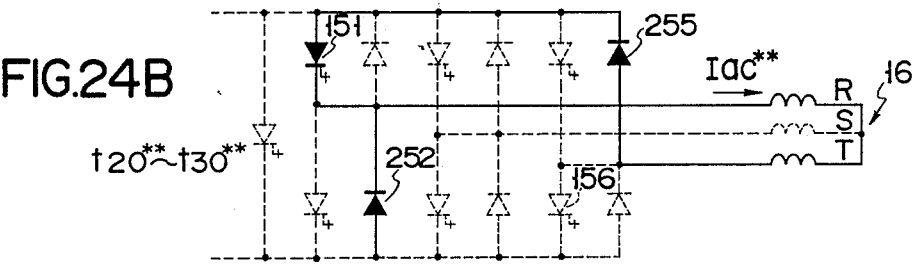

In a preceding current supply of about 60-degree phase angle (before t10 in FIG. 23A), a DC current Idc with a given amount flows through a DC circuit of the power converter into the circuit of, e.g., GTO 151 - winding R of motor 16 - winding T of motor 16 - GTO 156, as shown in FIG. 24A. Upon completion of the preceding current supply, current reference signal S2 (=Iref) becomes zero at time t10, and DC current Idc flowing through the DC circuit decreases from the given amount to zero (t10 to t20 in FIG. 23B). A circulating current interval due to the reactive energy from motor 16 starts from time t20** (FIG. 24B).

Figure 24C:
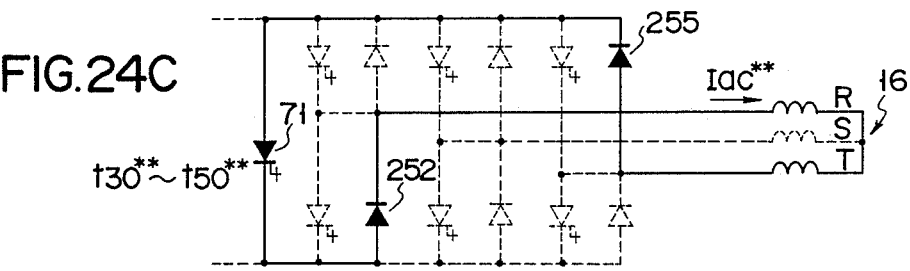

Turn-on pulse S5A is supplied to the shunting GTO 71 at time t30 (FIG. 23E) before nonconducting pulse S4B is generated at time t40 (FIG. 23D). Pulse S5A is generated so that GTO 71 is rendered conductive. Then, a temporary short-circuiting of the DC circuit is effected. A circulating current flows through the turned-on GTO 71 from time t30 (FIG. 24C). The circulating current becomes zero at time t50 (FIG. 23G).

Figure 24D:
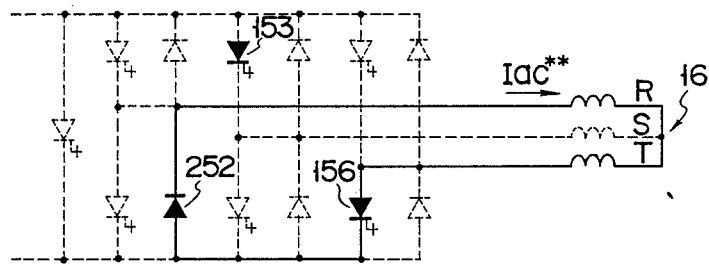

The next conducting pulse S4A for providing the subsequent current supply interval of about 60-degree phase angle is generated at time t60 (FIG. 23C), and conducting pulse S4A is supplied to GTOs 153 and 156 (FIG. 24D). But pulse S5A trails by subsequent time t70(FIG. 23E). Immediately after the disappearance of pulse S5A at time t70, turn-off pulse S5B is generated (FIG. 23F). Thereafter, turn-off pulse S5B is supplied to GTO 71 at time t70 (FIG. 23F) so that GTO 71 is rendered nonconductive at once. Here, if the circulating current does not become zero until time t70, the circulating current flows through GTO 156 and diode 252 until time t70 (FIG. 24D).

In any cases, although the circulating current interval depends on the magnitude of the reactive energy, a circulating current loop is always formed. The subsequent current supply interval of about 60-degree phase angle starts from time t80 and the corresponding DC current Idc flows thereafter (FIGS. 23A and 23B).

Incidentally, it is possible to make the circulating current supply interval short by consuming the reactive energy by a resistor connected in series to the turned-on GTO 71. (Such a resistor is shown by a dotted line in FIG. 22.)

Figure 21:
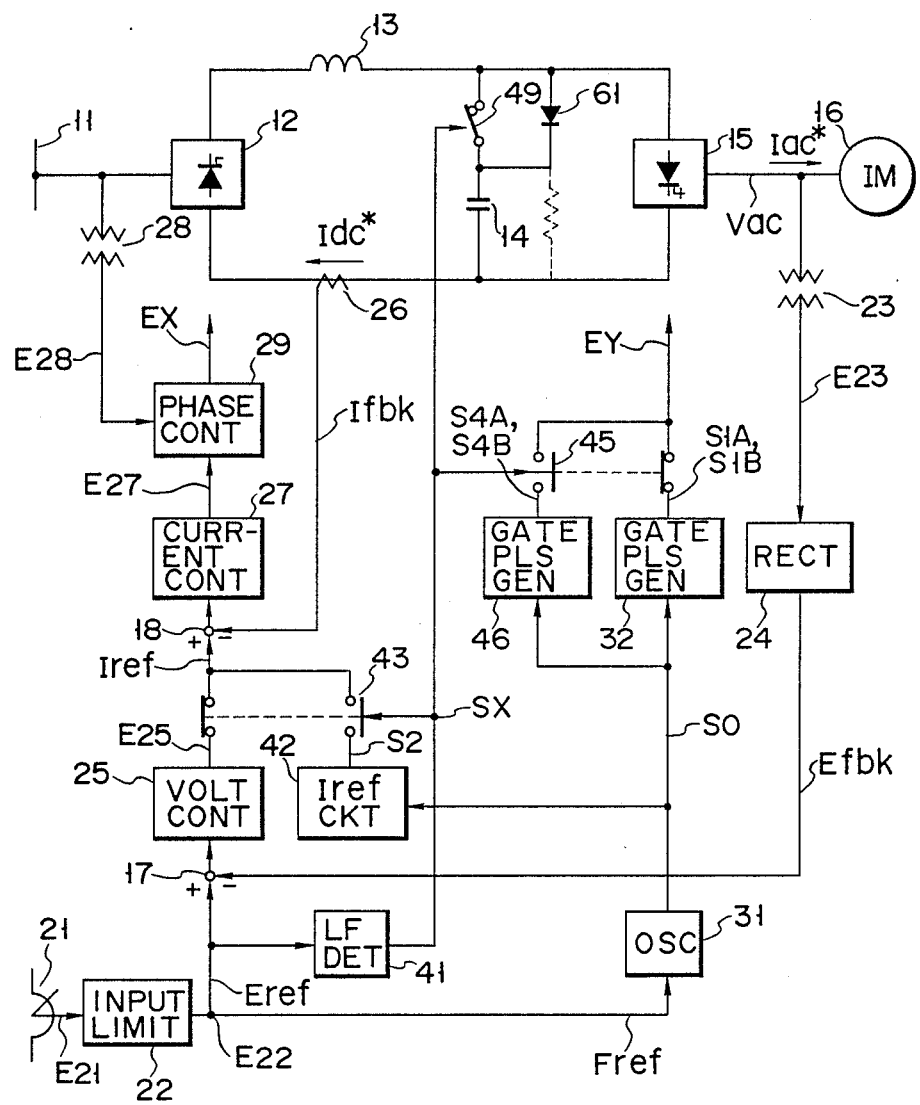
FIG. 21 shows a sixth embodiment of the present invention.

According to the FIG. 22 embodiment, a similar advantage as that obtained in the FIGS. 17 or 21 embodiment can be expected. The waveform of AC output current Iac** is substantially equivalent to the waveform of an AC output current of a current controlled converter and an excellent starting characteristic can be obtained.

FIG. 25 shows an eighth embodiment of the present invention, in which a means for regenerating the reactive energy from a load (motor) to an AC power source is employed. FIG. 25A shows details of a current reference circuit 81 in the embodiment of FIG. 25. FIGS. 26A to 26E show waveforms appearing in the configuration of the FIG. 25 embodiment.

The FIG. 25 embodiment differs from the FIG. 17 embodiment in the following point. That is, an inverter 12A is coupled via a reactor 3A in parallel to the series circuit of switch 49 and capacitor 14. The AC output of inverter 12A is coupled to AC power line 11. A current transformer 26A is arranged at a DC regenerating current path of inverter 12A. Transformer 26A generates a regenerating current feedback signal IfbkA (FIG. 26D) which represents the magnitude of a DC regenerating current flowing through inverter 12A. Signal IfbkA is supplied to the negative input of a comparator 19. The positive input of comparator 19 is coupled via a switch 82 to the output of a regenerating current reference circuit 81. Switch 82 is turned-on by a detection signal SX from low frequency detector 41.

Current reference circuit 81 is provided to receive the signal S0 (FIG. 26A) from oscillator 31. As shown in FIG. 25A, circuit 81 may be made of an output-variable pulse generator circuit. In this generator circuit, signal (pulse) S0 is supplied to an MMV 810. MMV 810 is triggered by the leading edge of signal S0 and generates a gate signal E810 with a pulse width PE810 determined by the time constant of this MMV (FIG. 26E). The pulse width PE810 is selected to be narrower than the pulse width of current reference signal S2 (FIGS. 26B and 26E). The phase of signal E810 is inverted by an inverter 812, and the phase-inverted signal E812 is supplied to the gate of an FET 814. The source (or drain) of FET 814 is connected to the inverted input of an operational amplifier 816. The drain (or source) of FET 814 is connected to the output of amplifier 816. A resistor R816 is connected in parallel to the drain-source path of FET 814. The inverted input of amplifier 816 receives a potential E818 from a potentiometer 818 through a resistor R818. Amplifier 816 delivers a signal E81 which is used as a regenerating current reference IrefA. The frequency of signal E81 is the same as signal S0. The peak potential (or amplitude) of E81 (or IrefA) is adjustable by potentiometer 818. The pulse width or the duty cycle of signal E81 or IrefA is determined according to the time constant of MMV 810.

In the configuration of FIG. 25, the triggering control for inverter 12A is effected by gate pulses EXA from a phase control circuit 29A. Gate pulses EXA is produced in a conventional manner according to a signal E28 from potential transformer 28 and a signal E27A from current control circuit 27A. When the signal SX is generated, the positive input of comparator 19 receives the signal E81 as regenerating current reference IrefA. (The potential of IrefA is zero if no detection signal SX is generated.) Comparator 19 supplies a signal of the difference between IrefA and IfbkA to a current control circuit 27A.

The circuit operation of the above regenerator arrangement may be substantially the same as that of a conventional regenerator. By the regenerating operation of inverter 12A, reactive energy from motor 16 is regenerated to power line 11. The amount of the regenerating current is controlled in accordance with the potential of current control reference IrefA.

Excluding the operation for the regeneration of reactive energy, the FIG. 25 embodiment operates substantially in the same manner as the FIG. 17 embodiment. The waveform of AC output current Iac (FIG. 26C) obtained in the FIG. 25 embodiment is similar to that (Iac*) obtained in the FIG. 17 embodiment. The time interval of t50* to t60* shown in FIG. 19E corresponds to the regenerating interval (the interval of PE810 in FIG. 26E) of the FIG. 25 embodiment.

In the FIG. 25 embodiment, in order to achieve the regeneration of reactive energy from motor 16 which appears at time t50 (FIG. 19E), the regenerating current (IfbkA) starts to flow before time t50. Then, the DC circuit of the converter becomes free from an excessive voltage due to the reactive energy.

According to the FIG. 25 embodiment, since reactive energy form the load (16) is regenerated to the AC power supply line (11), the efficiency is improved while ensuring an improved starting actuation for the load (induction motor, etc.).

As will be understood from the above description, although the power converter of the invention has a configuration of a voltage controlled converter (e.g., voltage-source inverter), an AC output current waveform similar to that of a current controlled converter can be obtained at the time of start of the load actuation. Accordingly, the following features can be derived from the embodiment of the invention:

(1) A square waveform AC output current having about 120-degree phase angle is allowed to flow through a 3-phase load induction motor at the time of start of actuation, so that a relatively large starting torque corresponding to the capacity of the power converter can be obtained;

(2) The magnitude of an AC output current is directly controlled by a DC current control loop in the DC circuit of the power converter, thereby ensuring a stable operation independently of the load condition;

(3) There is no need to reserve undue tolerance for the current control, so that the capacity of the power converter can be selected in optimum;

(4) The advantage of a voltage-source inverter is not spoiled in a normal power converter operation; and (5) The number of commutation times can be effectively reduced as compared with a conventional PWM control, so that a high-efficiency power converter is obtained.

What is claimed is:

1. A power converter for an AC induction type load comprising:
   detector means for detecting whether or not the frequency of an AC output from the power converter falls within a predetermined frequency range, and for generating a detection signal when the frequency of said AC output falls within a predetermined frequency range;
   current control means coupled to said detector means, for determining an AC output current of the power converter in accordance with a given current reference, when said detection signal is generated, said AC output current being supplied to the AC load;
   a voltage controlled type main circuit including,
   rectifier means for converting an AC input from an AC power source, in accordance with said given current reference, and providing a DC current to a DC circuit of the power converter;
   filter means for filtering ripples in said DC output of said rectifier means;
   inverter means for re-converting the filtered DC output from said filter means, to generate an AC output voltage to be applied to said AC load;
   voltage control means coupled to said detector means and said inverter means, for regulating the DC output voltage in accordance with a given voltage reference when the detection signal disappears;
   a capacitor coupled in parallel to said DC circuit for filtering off ripples in said DC current;
   release means coupled to said capacitor and said detector means, for releasing said capacitor from said DC circuit when said detection signal is generated; and
   absorbing means coupled to said DC circuit, for absorbing reactive energy from said AC load when said release means releases said capacitor from said DC circuit.

2. A power converter according to claim 1, wherein said predetermined frequency range represents a condition that an AC output voltage applied to said AC load is less than a given value.

3. A power converter according to claim 1, wherein said AC load includes an AC motor which generates a counter electromotive force with the rotation of a rotor thereof, and said predetermined frequency range represents a condition that the counter electromotive force is lower than a prescribed value.

4. A power converter according to claim 1, wherein said AC load includes an AC motor whose AC input impedance is lower than a prescribed value when a rotor of said motor is substantially stopped, and said predetermined frequency range represents a condition that an AC output circuit of the power converter is substantially short-circuited with the AC input impedance of said AC motor which is lower than said prescribed value.

5. A power converter according to claim 1, wherein said given current reference obtained when said detection signal is generated is independent of said given voltage reference.

6. A power converter according to claim 5, wherein said AC load includes an AC motor, and said predetermined frequency range represents a condition that the rotation speed, of said motor is lower than a prescribed value.

7. A power converter according to claim 6, wherein said given current reference is so determined that said AC output current ensures a sufficient starting torque to said motor.

8. A power converter according to claim 6, wherein said motor includes an induction motor.

9. A power converter according to claim 1, further comprising:

rectifier means for rectifying an AC input from an AC power source in accordance with said given current reference, and providing a DC current to a DC circuit of the power converter; and inverter means coupled to said DC circuit for inverting said DC current into said AC output current, wherein, during the generation of said detection signal, said given current reference has an alternative waveform with a given frequency so that the magnitude of said DC current is intermittently reduced to substantially zero.

* * * * *